(12) United States Patent
Lee

(10) Patent No.: US 12,284,569 B2
(45) Date of Patent: *Apr. 22, 2025

(54) METHOD, APPARATUS, AND COMPUTER PROGRAM FOR CONNECTIONLESS ASSET TRACKING IN WIRELESS COMMUNICATION SYSTEM, AND RECORDING MEDIUM THEREOF

(71) Applicant: INTELLECTUAL DISCOVERY CO., LTD., Seoul (KR)

(72) Inventor: Jea Ho Lee, Cheongju-si (KR)

(73) Assignee: INTELLECTUAL DISCOVERY CO., LTD., Seoul (KR)

( * ) Notice: Subject to any disclaimer, the term of this patent is extended or adjusted under 35 U.S.C. 154(b) by 319 days.

This patent is subject to a terminal disclaimer.

(21) Appl. No.: 17/758,570

(22) PCT Filed: Jan. 8, 2021

(86) PCT No.: PCT/KR2021/000230
§ 371 (c)(1),
(2) Date: Jul. 8, 2022

(87) PCT Pub. No.: WO2021/141429
PCT Pub. Date: Jul. 15, 2021

(65) Prior Publication Data
US 2023/0052957 A1 Feb. 16, 2023

(30) Foreign Application Priority Data
Jan. 10, 2020 (KR) .................. 10-2020-0003547

(51) Int. Cl.
*H04W 4/029* (2018.01)
*H04W 4/80* (2018.01)

(52) U.S. Cl.
CPC .............. *H04W 4/029* (2018.02); *H04W 4/80* (2018.02)

(58) Field of Classification Search
CPC ........ H04W 4/029; H04W 4/80; Y02D 30/70; H04L 9/40; H04L 69/26; H02J 50/20
See application file for complete search history.

(56) References Cited

U.S. PATENT DOCUMENTS

| 2013/0155954 A1* | 6/2013 | Wang | H04W 76/27 370/328 |
| 2013/0188538 A1* | 7/2013 | Kainulainen | G01S 5/04 370/310 |

(Continued)

OTHER PUBLICATIONS

International Search Report for PCT/KR2021/000230 by Korean Intellectual Property Office dated Apr. 22, 2021.

(Continued)

*Primary Examiner* — Sun Jong Kim
(74) *Attorney, Agent, or Firm* — BROADVIEW IP LAW, PC

(57) ABSTRACT

A method, an apparatus, and a computer program for a connectionless asset tracking service in a wireless communication system, and a recording medium thereof. A method for a connectionless asset tracking service in a wireless communication system may comprise the steps in which a first device: receives an advertising packet from a second device; determines whether at least one advertising data structure (AD structure) included in the advertising packet is an AD structure related to a connectionless asset tracking service; and on the basis of the AD structure related to the connectionless asset tracking service, determines the location of the second device, wherein an AD type field of the AD structure related to the connectionless asset tracking service includes a value indicating a connectionless tracking service.

8 Claims, 35 Drawing Sheets

(56) References Cited

U.S. PATENT DOCUMENTS

| | | | |
|---|---|---|---|
| 2015/0319579 A1 | 11/2015 | Syrjarinne et al. | |
| 2016/0105761 A1* | 4/2016 | Polo | H04W 4/80 |
| | | | 455/41.2 |
| 2016/0174058 A1* | 6/2016 | Lindholm | H04W 4/80 |
| | | | 370/329 |
| 2017/0208564 A1 | 7/2017 | Lee et al. | |
| 2017/0303071 A1 | 10/2017 | Haverinen et al. | |
| 2018/0074188 A1* | 3/2018 | Polo | G01S 13/42 |
| 2019/0182885 A1* | 6/2019 | Carlson | H04W 4/80 |
| 2020/0100091 A1* | 3/2020 | Lee | H04W 8/005 |
| 2020/0228953 A1* | 7/2020 | Thoukydides | H04W 24/08 |
| 2021/0400096 A1* | 12/2021 | Lee | H04L 65/1094 |

OTHER PUBLICATIONS

Lam, Ken. Bluetooth 5.1 Direction Finding, May 2019. [Retrieved on Apr. 12, 2021]. <URL: https://www.bluetooth.com/wp-content/uploads/2019/05/BTAsia/1145-NORDIC-Bluetooth-Asian-2019Bluetooth-5.1-Direction-Finding-Theory-and-Practice-v0.pdf>.

\* cited by examiner

FIG. 3

| | CtrData | | | | | |
|---|---|---|---|---|---|---|
| (a) | WinSize (1 octet) | WinOffset (2 octets) | Interval (2 octets) | Latency (2 octets) | Timeout (2 octets) | Instant (2 octets) |

| | CtrData | | | | | | | | | | | |
|---|---|---|---|---|---|---|---|---|---|---|---|---|
| (b) | Interval_Min (2 octets) | Interval_Max (2 octets) | Latency (2 octets) | Timeout (2 octets) | PreferredPeriodicity (1 octet) | ReferenceConnEventCount (2 octets) | Offset0 (2 octets) | Offset1 (2 octets) | Offset2 (2 octets) | Offset3 (2 octets) | Offset4 (2 octets) | Offset5 (2 octets) |

| OCTET: | 2 | | 1 | 1 | 1 | |
|---|---|---|---|---|---|---|
| (a) | OpCode | | PARAMETER TOTAL LENGTH | PARAMETER 0 | PARAMETER 1 | ... |
| | OCF | OGF | | | | |

| OCTET: | 1 | 1 | 1 | 1 | |
|---|---|---|---|---|---|
| (b) | EVENT CODE | PARAMETER TOTAL LENGTH | PARAMETER 0 | PARAMETER 1 | ... |

BLE MODULE (a)  (b)

METHOD, APPARATUS, AND COMPUTER PROGRAM FOR CONNECTIONLESS ASSET TRACKING IN WIRELESS COMMUNICATION SYSTEM, AND RECORDING MEDIUM THEREOF

CROSS-REFERENCE TO RELATED APPLICATIONS

This application is a National Phase Entry Application of PCT Application No. PCT/KR2021/000230 filed on Jan. 8, 2021, which claims priority to Korean Patent Application No. 10-2020-0003547 filed on Jan. 10, 2020, in Korean Intellectual Property Office, the entire contents of which are hereby incorporated by reference in its entirety.

TECHNICAL FIELD

The present disclosure relates to a wireless communication system, and specifically, to a method, an apparatus, a computer program, and a recording medium thereof for a connectionless asset tracking service in a wireless communication system.

BACKGROUND

Bluetooth is a short-range wireless communication standard and includes BR (Basic Rate)/EDR (Enhanced Data Rate) technology and LE (Low Energy) technology. BR/EDR is also called Bluetooth classic, and includes BR technology applied from Bluetooth 1.0 and EDR technology applied from Bluetooth 2.0. Bluetooth LE (BLE) applied after Bluetooth 4.0 is a technology that supports transmission and reception of relatively large data with low power consumption.

Wireless power transfer technology includes a magnetic induction method using a magnetic induction phenomenon between a primary coil and a secondary coil, and a magnetic resonance method in which magnetic resonance is achieved using a frequency of several tens of kHz to several MHz bands to transmit power.

In addition, communication between a power transfer unit (PTU or PTx) and a power receiving unit (PRU or PRx) is required in a wireless power transfer system. In the existing wireless power transfer system, it is possible to support in-band communication in which various information is transmitted and received on a band or channel used for wireless power transfer. In-band communication is not suitable for transmitting and receiving quick and large-capacity data required in an advanced wireless power transfer system because there are limitations due to low transfer speed and low transfer capacity. Therefore, a technology for transmitting and receiving information in an out-of-band (OOB) method rather than a band or channel used for wireless power transfer is required, and a BLE wireless communication system may be used as the OOB technology.

Meanwhile, asset tracking means tracking a physical object, and may include localization, location measurement, or location estimation. Among the conventional localization methods, the angle measurement method requires a connection between a transmitter and a receiver. A specific method for performing asset tracking in a connectionless method has not yet been prepared.

DISCLOSURE

Technical Problem

The technical problem of the present disclosure is to provide a method and apparatus for performing asset tracking in a connectionless manner in a wireless communication system.

An additional technical problem of the present disclosure is to provide a method and apparatus for quickly and accurately determining a location between devices in a wireless power transmission system.

The technical problems to be achieved in the present disclosure are not limited to the technical problems mentioned above, and other technical problems not mentioned will be clearly understood by those of ordinary skill in the art to which the present disclosure belongs from the following description.

Technical Solution

A method for a connectionless asset tracking service in a wireless communication system according to an aspect of the present disclosure may include receiving, by a first device, an advertising packet from a second device; determining whether at least one advertising data structure (AD structure) included in the advertising packet is an AD structure related to the connectionless asset tracking service; and determining a location based on the AD structure related to the connectionless asset tracking service, and an AD type field of the AD structure related to the connectionless asset tracking service may include a value indicating the connectionless asset tracking service.

A device performing a connectionless asset tracking service in a wireless communication system according to an additional aspect of the present disclosure may include a transceiver; a memory; and a processor coupled to the transceiver and the memory, and the processor may be configured to: receive, by the device, an advertising packet from another device; determine whether at least one advertising data structure (AD structure) included in the advertising packet is an AD structure related to the connectionless asset tracking service; and determine a location based on the AD structure related to the connectionless asset tracking service, and an AD type field of the AD structure related to the connectionless asset tracking service may include a value indicating the connectionless asset tracking service.

The features briefly summarized above with respect to the present disclosure are merely exemplary aspects of the detailed description of the present disclosure that follows, and do not limit the scope of the present disclosure.

Technical Effects

According to the present disclosure, a method and an apparatus for performing asset tracking in a connectionless manner may be provided in a wireless communication system.

An additional technical problem of the present disclosure is to provide a method and apparatus for quickly and accurately determining a location between devices in a wireless power transmission system.

The technical effects of the present disclosure are not limited to the above-described effects, and other effects not mentioned herein may be understood to those skilled in the art from the following description.

BRIEF DESCRIPTION OF DRAWINGS

FIG. 3 is a diagram for describing an example of a parameter used for connection parameter update to which the present disclosure is applicable.

FIG. 16 shows an exemplary HCI packet format to which this disclosure is applicable.

BEST MODE

Figure 1:
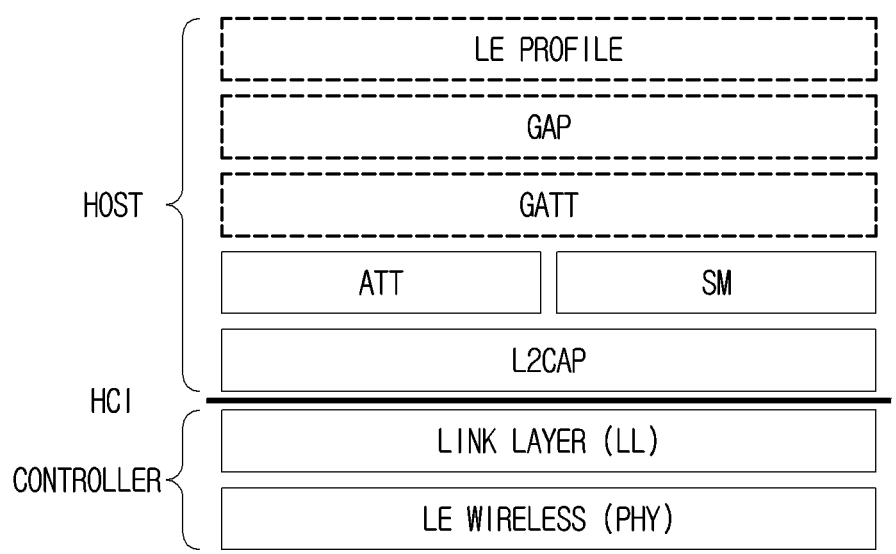
FIG. 1 is a diagram illustrating a BLE protocol stack to which the present disclosure is applicable.

Hereinafter, with reference to the accompanying drawings, embodiment of the present disclosure will be described in detail so that those of ordinary skill in the art to which the present disclosure belongs can easily implement them. However, the present disclosure may be embodied in several different forms and is not limited to the embodiments described herein.

In describing the embodiments of the present disclosure, if it is determined that a detailed description of a well-known configuration or function may obscure the gist of the present disclosure, a detailed description thereof will be omitted. And, in the drawings, parts not related to the description of the present disclosure are omitted, and similar reference numerals are attached to similar parts.

In the present disclosure, when a component is "connected", "coupled" or "accessed" to another component, it may include not only a direct connection relationship, but also an indirect connection relationship in which another component exists in the middle. Also, in the present disclosure, the terms "comprises" or "have" specify the presence of a recited feature, step, operation, element and/or component, but it does not exclude the presence or addition of one or more other features, steps, operations, elements, components and/or groups thereof.

In the present disclosure, terms such as "first" and "second" are used only for the purpose of distinguishing one component from other components and are not used to limit the components. And, unless otherwise noted, the terms do not limit the order or importance between the components. Accordingly, within the scope of the present disclosure, a first component in one embodiment may be referred to as a second component in another embodiment, and similarly, a second component in one embodiment may be referred to as a first component in another embodiment.

In the present disclosure, the components that are distinguished from each other are for clearly describing each characteristic, and do not necessarily mean that the components are separated. That is, a plurality of components may be integrated to form one hardware unit or a software unit, or one component may be distributed to form a plurality of hardware units or software units. Accordingly, even if not specifically mentioned, such integrated or dispersed embodiments are also included in the scope of the present disclosure.

The various embodiments of the present disclosure are not intended to list all possible combinations of components, but rather to illustrate representative aspects of the disclosure, and some or all of the components described in the various embodiments may be applied independently or in combination of two or more. That is, components described in various embodiments of the present disclosure do not necessarily mean essential components, and some may be optional components. Accordingly, an embodiment composed of a subset of components described in one embodiment is also included in the scope of the present disclosure. In addition, embodiments including other components in addition to components described in various embodiments are also included in the scope of the present disclosure.

Example methods of the present disclosure are expressed as a series of operations for clarity of description, but this is not intended to limit the order in which the steps are performed, and if necessary, each step may be performed simultaneously or in a different order. In addition, in order to implement the method according to the present disclosure, other steps may be included in addition to the illustrated steps, steps may be included except for some steps, or additional steps may be included except for some steps.

Terms used in the present disclosure is for the description of specific embodiments and is not intended to limit the claims. As used in the description of the embodiments and in the appended claims, the singular form is intended to include the plural form as well, unless the context clearly dictates otherwise. Also, the term "and/or" used in the present disclosure may refer to one of the related enumerations, or is meant to refer to and include all possible (or random) combinations of two or more thereof.

Hereinafter, a method for wireless communication in the wireless power transfer system according to the present disclosure will be described.

FIG. 1 is a diagram illustrating a BLE protocol stack to which the present disclosure is applicable.

The BLE protocol stack may be composed of a lower layer controller stack and an upper layer host stack based on a host controller interface (HCI). The controller stack may generally run on hardware, and the host stack may typically run on software.

Information transmitted from the host to the controller may be referred to as an HCI command packet. Information transmitted from the controller to the host may be referred to as an HCI event packet.

The controller stack may include an LE radio (Radio) layer and a link layer (Link Layer, LL). The controller stack may also be referred to as a core stack.

The LE radio layer (i.e., the physical (PHY) layer) is responsible for transmitting and receiving data on the physical medium.

The LL is responsible for a function of link control, negotiation, and establishment, a function of selecting a frequency and transmitting data, and a function of supporting various topologies and various methods of exchanging data.

The host stack may include Logical-Link Control and Adaptation Protocol (L2CAP), Attribute protocol (ATT), Security Manager (SM), Generic Attribute Profile (GATT), Generic Access Profile (GAP), and LE profiles.

L2CAP is responsible for the interface function between the upper layer and the lower layer (e.g., the function of arbitration and coordination between the upper layer and the lower layer).

ATT is responsible for discovering, reading, and writing about attributes between devices according to server and client models.

The SM is responsible for defining procedures for pairing, authentication, encryption, and the like between devices.

GATT is responsible for defining the structure for services and characteristics based on attributes, defining a method of discovering, reading, writing, notifying, and indicating a characteristic, and defining the configuration method for attribute broadcast.

GAP defines basic functions common to all devices related to device discovery, connectivity, security, etc.

The LE profile is a profile based on GATT, and may include, for example, a profile for battery, time, proximity, and the like.

Figure 2:
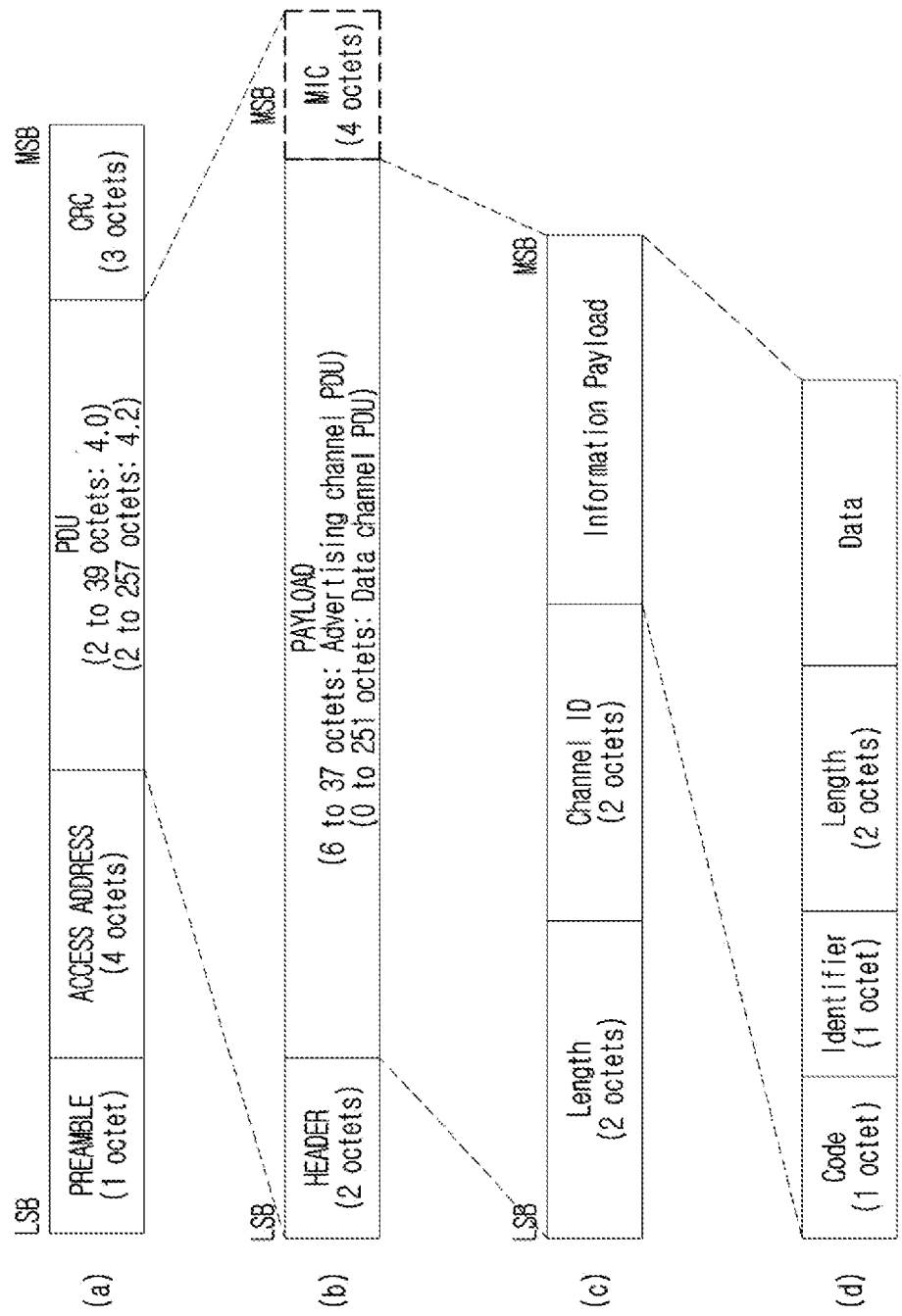
FIG. 2 is a diagram illustrating a packet format for each layer to which the present disclosure is applicable.

FIG. 2 is a diagram illustrating a packet format for each layer to which the present disclosure is applicable.

FIG. 2(a) illustrates an example of link layer (LL) packet format. The LL packet format may include a preamble, an access address (or an access code), a PDU, and a Cyclic Redundancy Code (CRC) field. The preamble may have a size of 1 octet, may be used for frequency synchronization, symbol timing estimation, automatic gain control (AGC) training, and the like at the receiving side, and may be configured with a predetermined bit sequence. The access address may have a size of 4 octets and may be used as a correlation code for a physical channel. A PDU may be defined with a size of 2 to 39 octets in Bluetooth 4.0 version, and may be defined as a size of 2 to 257 octets in version 4.2. The CRC may include a value calculated as a 24-bit long checksum for the PDU.

FIG. 2(b) illustrates an exemplary format of the PDU of FIG. 2(a). PDU may be defined in two types, one is a data channel PDU (Data channel PDU), the other is an advertising channel PDU (Advertising channel PDU).

The advertising channel PDU may be used to transmit packets on an advertising physical channel (e.g., channel numbers 37, 38, 39). The advertising channel PDU may consist of a header of 2 octets and a payload of 6 to 37 octets. In this case, the header may include a PDU type, a Reserved for Future Use (RFU), a transmission address (TxAdd), a reception address (RxAdd), a length (Length), and an RFU field. The length field of the header may indicate the size of the payload.

In the case of an advertising channel PDU, one or more advertisement data structures (AD structures) may be included in the payload. Each AD structure may include an AD Length of 1 octet, an AD Type of 1 octet, and an AD Data field of a maximum size of 29 octets.

A data channel PDU may be used to transmit packets on a data physical channel (e.g., channel numbers 0-36). The data channel PDU may include a header with a size of 2 octets and a payload with a size of 0 to 251 octets. In this case, the header may include a Logical Link Identifier (LLID), Next Expected Sequence Number (NESN), Sequence Number (SN), More Data (MD), CTEInfo Present (CP), RFU, and Length fields. The data channel PDU may further include a Message Integrity Check (MIC) field, for example, the MIC field may be included in the case of an encrypted link layer connection in which the payload field size is not 0. The length field of the header may indicate the size of the payload, and if the MIC is included, it may indicate the length of the payload and the MIC.

FIG. 2(c) shows an example of an L2CAP PDU format, which may correspond to an example format of the payload field of FIG. 2(b). The L2CAP PDU may include a length, a channel ID, and an information payload field. The length field may indicate the size of the information payload, and the information payload field may include higher layer data. The channel identifier field may indicate which upper layer data the information payload field includes. For example, if the value of the channel identifier field is 0x0004, ATT (ATTribute protocol), if 0x0006, may indicate SMP (Security Manager Protocol), or another channel identifier indicating another type of upper layer or middleware Values can be defined and used.

When the L2CAP packet of FIG. 2(c) is an L2CAP PDU (i.e., a control frame) transmitted on a signaling channel, the information payload field of FIG. 2(c) may be configured as shown in FIG. 2(d). The information payload field may include a code, an identifier, a length and data fields. For example, the code field may indicate the type of the L2CAP signaling message. The identifier field may include a value that matches the request and the response. The length field may indicate the size of the data field. Data fields may contain attributes. The attribute is a unit of arbitrary data, and may include, for example, data at various points in time in various states of the device, such as location, size, weight, temperature, and speed.

An attribute may have a format including an attribute type, an attribute handle, an attribute value, and an attribute permission.

The attribute type may include a value indicating the type of attribute data identified by a Universally Unique Identifier (UUID).

The attribute handle may contain a value assigned by the server to identify attribute data.

The attribute value may include the value of attribute data.

Attribute permission may be configured by GATT (Generic ATTribute profile), and may include a value indicating the type of allowed access (e.g., whether it can read/write, whether encryption is required, whether authentication is required, whether authorization is required, etc.) to the corresponding attribute data.

In point of view of an Attribute protocol (ATT)/Generic Attribute Profile (GATT), a device may serve as a server and/or a client. The server may serve to provide attributes and related values, and the client may play a role of discovering, reading, or writing attributes on the server.

In ATT/GATT, it may support the transmission and reception of attribute data between the server and the client. For this, the PDU supported by the ATT protocol may include six method types, that is, request, response, command, notification, indication, and confirmation.

A request is sent from the client to the server, and a response from the server is required. A response is sent from the server to the client, and is sent when there is a request from the client. A command is sent from the client to the server, and no response is required. A notification is sent from the server to the client, and confirmation is not required. An indication is sent from the server to the client, and confirmation of the client is required. A confirmation is sent from the client to the server, and is sent when there is an instruction from the server.

In addition, GATT may support various profiles. The structure of the GATT-based profile may be described as a service (service) and characteristics (characteristics). A device may support one or more profiles. One profile may include zero or one or more services. A plurality of profiles may use the same service. One service may include one or more characteristics. A characteristic means a data value that is the subject of read, write, indicate, or notify. That is, a service may be understood as a data structure used to describe a specific function or feature, and a service that is a combination of characteristics may indicate an operation performed by a device. All services are implemented by the server and may be accessed by one or more clients.

FIG. 3 is a diagram for describing an example of a parameter used for updating a connection parameter to which the present disclosure is applicable.

FIG. 3(a) exemplarily shows the structure of a control data (CtrData) field included in an LL_CONNECTION_UPDATE_IND_PDU. For example, the control data field may include a window size (WinSize), a window offset (WinOffset), an interval, a latency, a timeout, and an instant fields.

The WinSize field may be configured to indicate a transmitWindowSize value. The WinOffset field may be configured to indicate a transmit window offset (transmitWindowOffset) value. The Interval field may be configured to indicate a connection interval (connInterval) value. The Latency field may be configured to indicate a connection slave latency (connSlaveLatency) value. The Timeout field may be configured to indicate a connection supervision timeout (connSupervisionTimeout) value. The Instant field may be configured to indicate a predetermined reference instant.

FIG. 3(b) exemplarily shows the structure of the control data (CtrData) field included in the LL_CONNECTION_PARAM_REQ_PDU. For example, the control data field may include a minimum interval (Interval Min), a maximum interval (Interval Max), latency (Latency), timeout (Timeout), preferred period (PreferredPeriodicity), reference connection event count (ReferenceConnEventCount), a plurality of offsets (Offset0)) and offset (Offset1, Offset2, Offset3, Offset4, Offset5) fields.

The Interval Min field may be configured to indicate a minimum value of a connection interval (connInterval). The Interval Max field may be configured to indicate the maximum value of connInterval. The Latency field may be configured to indicate a connection slave latency (connSlaveLatency) value. The Timeout field may be configured to indicate a connection supervision timeout (connSupervisionTimeout) value. The PreferredPeriodicity field may be configured to indicate a value of a multiple preferred for connInterval. The ReferenceConnEventCount field may be configured to indicate a connection event counter (connEventCounter) value for calculation of all valid Offset0 to Offset5 fields. Offset0, Offset1, Offset2, Offset3, Offset4, and Offset5 fields may be configured to indicate possible values of the anchor point position relative to ReferenceConnEventCount.

Figure 4:
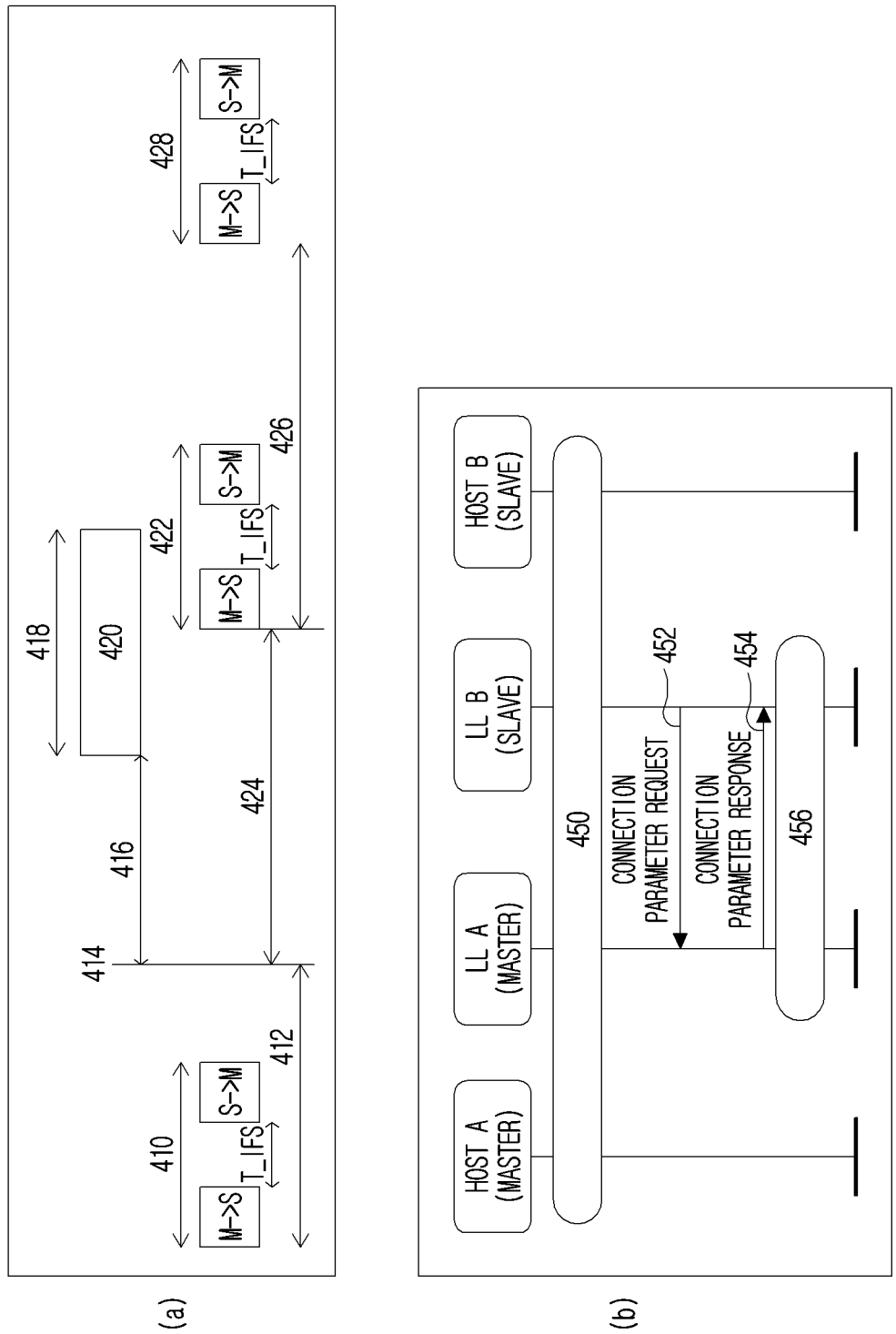
FIG. 4 is a diagram illustrating examples of a connection parameter update procedure to which the present disclosure is applicable.

FIG. 4 is a diagram illustrating examples of a connection parameter update procedure to which the present disclosure is applicable.

FIG. 4(a) illustrates a connection event timing when a connection parameter is updated based on parameters included in the CtrData field described in the example of FIG. 3.

The last event 410 transmitted based on the existing connection parameters may include transfer from master to slave (M→S), a time interval of T_IFS (inter frame space), and transfer from slave to master (S→M). In addition, an event may occur at every existing connection interval 412, a next event occurrence time after the last event occurrence may correspond to the instant 414, and a new connection parameter may be applied after the instant 414.

After the transfer window offset 416 with respect to the instant 414, the transfer window 420 may be configured according to the transfer window size 418. A first event 422 transmitted based on the new connection parameter within the transfer window may occur. The occurrence time of the first event is configured to a time point after t time 424 from the instant 414, and t may have a value greater than or equal to the transfer window offset and less than or equal to the sum of the transfer window offset and the transfer window size. Also, an event may occur at every new connection interval 426, and a second event 428 may occur after a new connection interval 426 after the first event occurs.

FIG. 4(*b*) shows an example of a connection parameter request procedure initiated by a slave.

For example, it indicates a case where the slave requests to change the anchor point and the master allows it. The link layer (LL B) of the slave wants to perform the anchor point movement, and the link layer (LL A) of the master may allow this (450).

A request message for changing a connection parameter may be transmitted from LL B to LL A (452), and in response, an instruction message for changing a connection parameter from LL A to LL B may be transmitted (454). Specifically, the connection parameter request procedure may be initiated by the slave issuing an LL_CONNECTION_PARAM_REQ_PDU. This procedure may be initiated as a result of a connection update procedure initiated by the host, or may be initiated voluntarily by the LL (i.e., without a request by the host). For the LL_CONNECTION_PARAM_REQ_PDU transmitted by the slave, the master may respond by using the LL_CONNECTION_UPDATE_IND_PDU or the LL_REJECT_EXT_IND_PDU.

Accordingly, the updated connection parameters may be used between LL A and LL B (456).

Hereinafter, a wireless power transfer system to which the present disclosure is applicable will be described.

A wireless power transfer (WPT) technology is a technology for wirelessly transferring electrical energy through various methods, and a wireless power transfer technology applied when the load is a battery can be called a wireless charging technology.

For wireless power transfer, various methods such as magnetic coupling, radio frequency, microwave, and ultrasound may be used. Among them, magnetic coupling-based wireless power transfer includes: a magnetic induction method using a magnetic induction phenomenon between the transmitting coil or primary coil of the power transmitting side and the receiving coil or secondary coil of the power receiving side, and a magnetic induction method using a magnetic induction phenomenon between the transmitting coil or primary coil of the power transmitting side and the receiving coil or secondary coil of the power receiving side. However, the wireless power transfer method to which the present disclosure is applicable is not limited to this example.

The wireless power transfer standard for the magnetic resonance method is led by Alliance for Wireless Power (A4WP), and the magnetic induction method is led by the Wireless Power Consortium (WPC).

The WPC is designed to transmit and receive various status information and commands related to the wireless power transfer system in-band. However, since in-band communication is not a system designed specifically for communication, it is not sufficient for faster information exchange and exchange of various information. Accordingly, an attempt is made to exchange information related to a wireless power transfer system in combination with another wireless communication system operating in an out-of-band (OOB). NFC and BLE technologies are being discussed as representative OOB technologies.

Qi is a magnetic induction wireless power transfer standard led by WPC. In Qi, various messages are defined so that the PTU and the PRU may exchange status information required to perform wireless power transfer. Before performing wireless power transfer in earnest, the PTU and the PRU exchange messages and share information for power transfer with each other. Qi provides an in-band channel for communication between PTU and PRU itself. However, since these in-band channels are not designed specifically for communication, they are not suitable for fast and reliable transmission of important information. Accordingly, a method of exchanging information related to wireless power transfer by using another wireless communication system as an OOB channel has been proposed. BLE is one of the representative OOB technologies for wireless power transfer, and has advantages such as a faster transfer speed compared to the existing in-band channel and a convenient data transmission method based on GATT.

Qi defines authentication information such as a certificate and a certificate chain for authentication between a PTU and a PRU, and the actual authentication procedure is also performed based on these information. For example, after a certificate exchange is first performed between an authentication initiator and a responder, a method in which the initiator authenticates the responder in a challenge/response method based on a public key specified in the certificate may be applied. The authentication between the PTU and the PRU is an essential procedure for safe wireless power transfer. Therefore, OOB also needs to support it.

However, authentication defined in Qi is done through separately defined Authentication Request/Response messages, but currently BLE does not have a protocol necessary to transmit these messages, so it is necessary to define a new protocol for exchanging Qi authentication information. In addition, considering that the default MTU (Maximum Transmission Unit) defined in the GATT protocol, which is most commonly used for information transfer in BLE, is 23 bytes, a new protocol needs to be defined to properly convey Qi authentication information, which may range from at least 34 bytes to over 200 bytes.

In addition, in the Qi authentication information exchange, a data communication channel for exchanging authentication data is defined (e.g., Auxiliary Data Transport (ADT), ADC (Auxiliary Data Control), etc.), and it is necessary to define a new protocol for supporting this in OOB (e.g., BLE).

The present disclosure includes an example in which a device of a wireless power transfer system detects a change in impedance, and changes a BLE operation based on this. For example, it may include a method of precisely measuring whether the power receiving side (PRx) moves by changing parameters related to BLE connection and advertising when a change in impedance is detected.

In addition, the present disclosure includes an example supporting wireless power transfer service quick discovery (WPT Service quick discovery). For example, it may include a method of defining a service related to wireless power transfer and rapidly searching and discovering a function or capability indicated by a characteristic included in the corresponding service.

Figure 5:
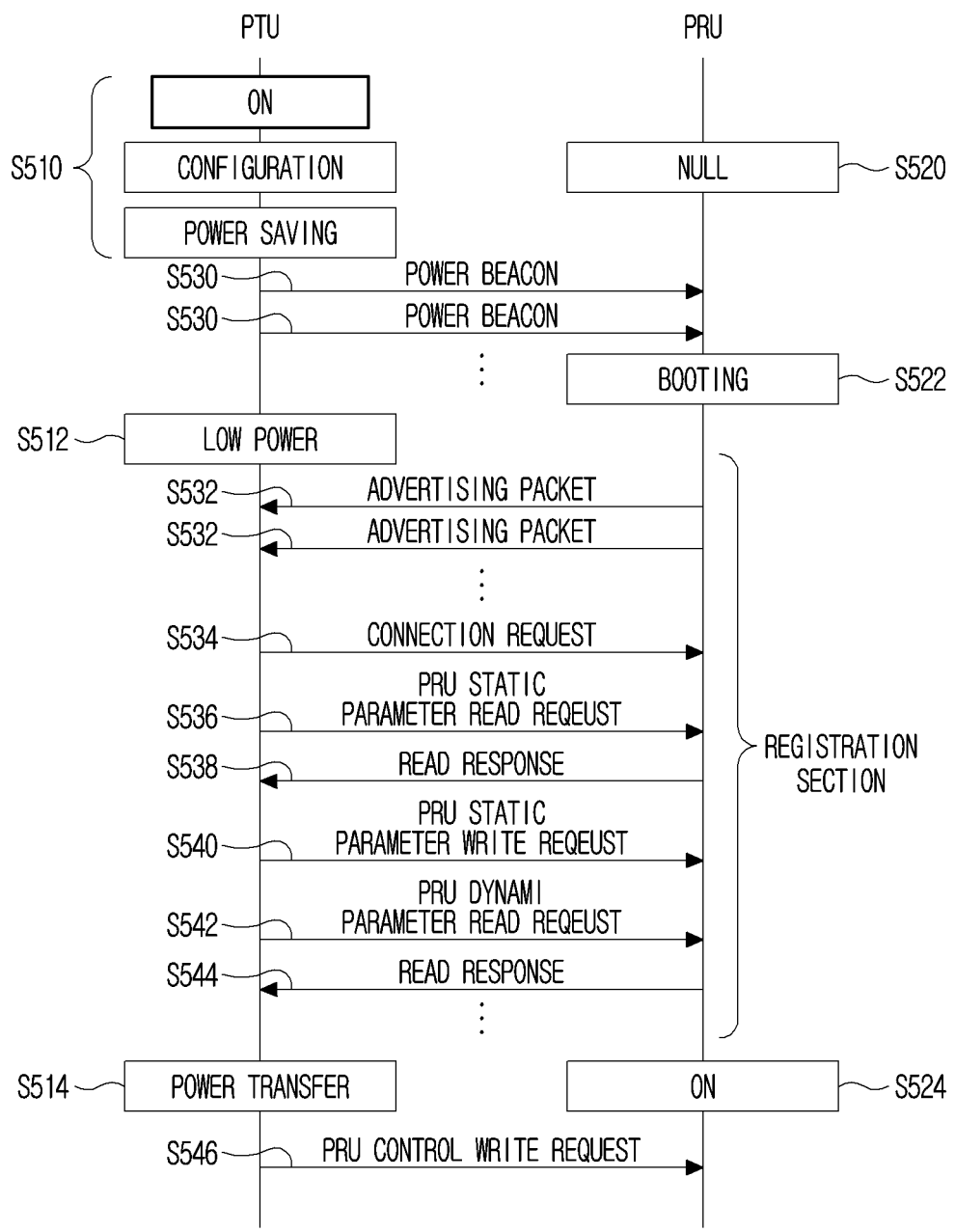
FIG. 5 shows an example of wireless power transfer information exchange to which the present disclosure is applicable.

FIG. 5 shows an example of wireless power transfer information exchange to which the present disclosure is applicable.

The example of FIG. 5 may be applied to both In-Band or OOB information exchange.

When the PTU is powered on, it may enter a power-save state through a configuration state that is an initialization step (S510).

The PTU may transmit a power beacon in a power-save state (S530).

The PRU may be in a null state until it receives a power beacon from the PTU (S520).

Upon detecting a power beacon from the PTU, the PRU may transmit an advertising packet to the PTU through a booting step (S522) (S532). The PTU may receive an advertising packet from the PRU in a low power state (S512).

Upon receiving the BLE advertising packet from the PRU, the PTU may start establishing a BLE connection by transmitting a connect request to the PRU (S534).

When BLE communication is enabled, the PTU may transmit a read request message to the PRU (S536). The read request message may include information for requesting static parameters of the PRU. In response, the PRU may transmit a read response message including the PRU static parameters including its state information to the PTU (S538).

The PTU may transmit a write request message including PTU static parameter information including its capability information to the PRU (S540).

After the PTU and the PRU mutually exchange static parameter information, the PTU may transmit a read request message requesting a dynamic parameter of the PRU to the PRU (S542). In response, the PRU may transmit a read response message including its own dynamic parameter information (e.g., voltage, current, temperature, etc.) to the PTU (S544). Dynamic parameter information may be periodically transmitted from the PRU to the PTU. For example, the PTU may periodically send a read request and receive a read response thereto, or the PRU may request that the PRU send a read response whenever the dynamic parameter state of the PRU is changed while the PTU sends a single read request.

As described above, the process of S532 to S544 may be referred to as a registration section. After registration is completed, the PTU may initiate power transfer (S514), and the PRU may receive power transmitted from the PTU (S524).

When the PTU informs the PRU that charging will start or controls the PRU's permission, the PTU may control the PRU using a write request message (S546).

Figure 6:
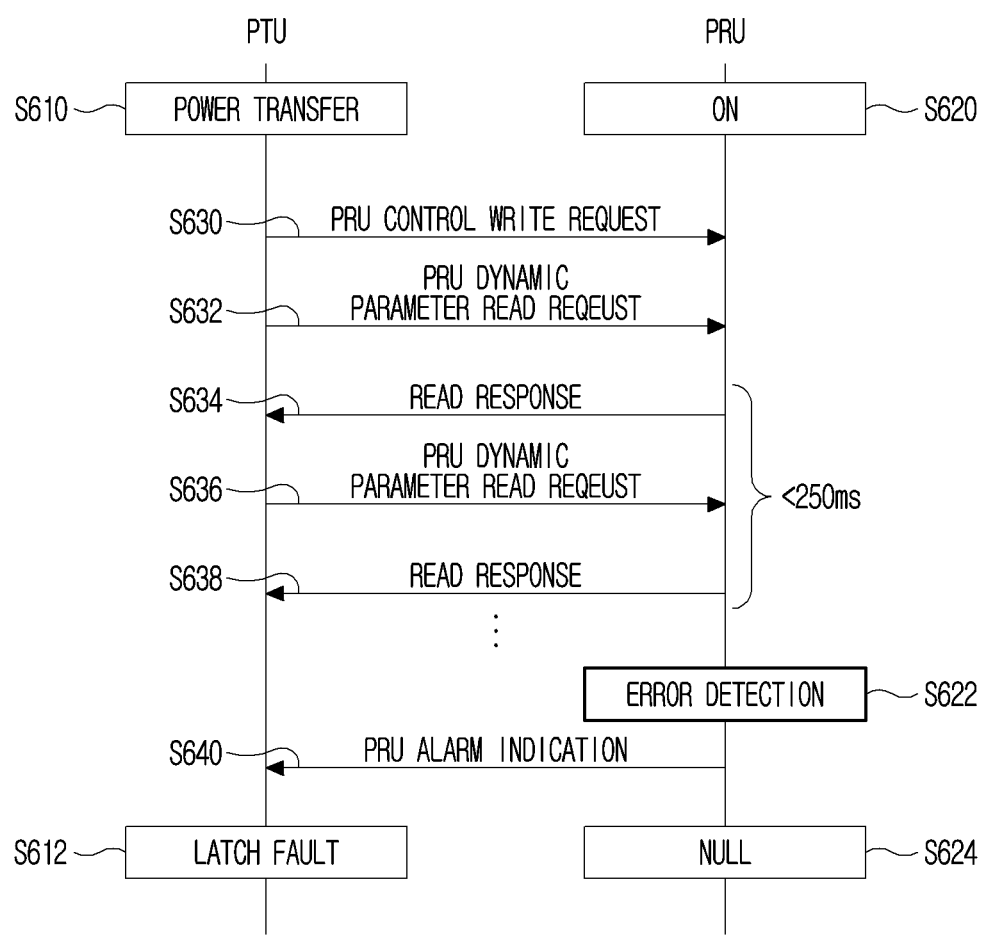
FIG. 6 shows an additional example of wireless power transfer information exchange to which the present disclosure is applicable.

FIG. 6 shows an additional example of wireless power transfer information exchange to which the present disclosure is applicable.

After the power transfer from the PTU to the PRU (S610) and power reception of the PRU (S620) are started, the PTU may transmit a write request message for PRU control (S630).

Thereafter, the PTU may transmit a dynamic parameter read request message to the PRU (S632) and receive a read response message thereto (S634). The read request/response process of the PRU dynamic parameter may be repeated (S636 and S638). This process may be triggered based on a predetermined event or may be performed in a periodic manner. For example, the interval between read response messages may be set to 250 ms or less.

When the PRU detects an error (S622), it may transmit an indication message including information indicating this to the PTU (S640). For example, information notifying an error may be configured in the form of a PRU alert (Alert), and the content may be OVP (Over Voltage Protection).

When the PTU receives the indication message including the PRU Alert, it may be in a latch fault state (S612). Also, the PRU in which an error has occurred may be in a null state (S624).

Figure 7:
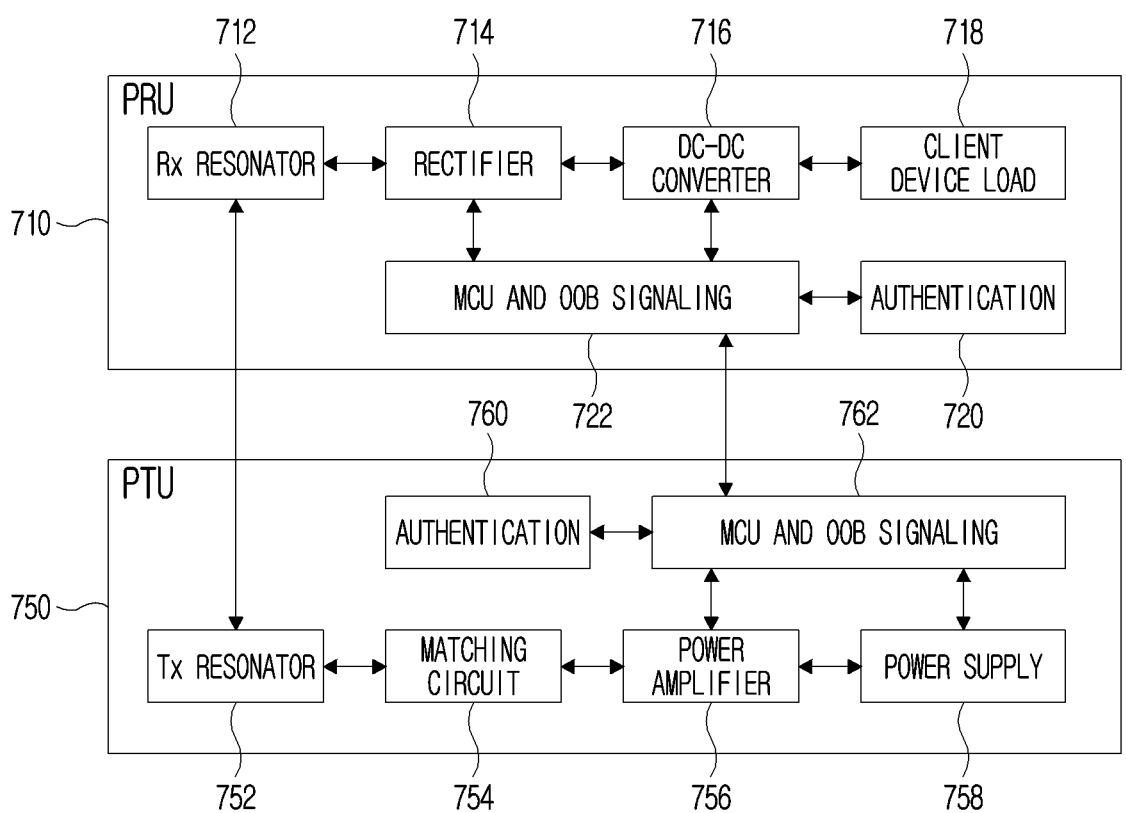
FIG. 7 is a diagram exemplarily illustrating the structure of a PRU and a PTU to which the present disclosure may be applied.

FIG. 7 is a diagram exemplarily illustrating the structure of a PRU and a PTU to which the present disclosure may be applied.

PRU 710 may include Rx resonator 712, rectifier 714, DC-DC converter 716, client device load 718, authentication module 720, main controller unit (MCU) and OOB signaling module (722), etc.

The Rx resonator 712 may select a specific frequency in the signal. The rectifier 714 may rectify the coil voltage and transmit it to the power amplifier while maintaining it at an appropriate voltage. The DC-DC converter 716 may convert a voltage rectified by a rectifier (full bridge) into a target voltage output. The client device load 718 may deliver the charging power of the load required by the client device. The authentication module 720 may perform authentication between the PRU and the PTU. The MCU and the OOB signaling module 722 may support low-power wireless communication (e.g., BLE), and may support searching for another device to be connected or transmitting data.

The PTU 750 may include transmission resonator (Tx resonator) 752, matching circuit 754, power amplifier 756, power supply 758, authentication module 760, MCU and OOB signaling module 762 etc.

Tx resonator 752 may generate a waveform of a specific frequency. The matching circuit 754 may receive a pulse width modulation (PWM) signal from the MCU and transmit the signal to the inverter to drive it. The inverter may correspond to an inverter for power conversion per coil, and may include, for example, four inverters, and may use two 4-channel logic switches to transmit a signal to the inverter. The power amplifier 756 may receive data from the MCU and control a voltage corresponding to the DC-DC converter as a driving voltage input to the inverter. The power supply 758 may receive external power and internal power under the control of the MCU to supply power required for operation of each component. The authentication module 760 may perform authentication between the PRU and the PTU. The MCU and the OOB signaling module 762 may support low-power wireless communication (e.g., BLE), and may support searching for another device to be connected or transmitting data.

Hereinafter, an operation related to a power sharing mode will be described.

Table 1 shows examples of the meaning according to the bit value of the permission, and Table 2 shows examples of parameters included in the adjust power capability of PRU information and the meaning of their values, and Table 3 shows examples of parameters included in an adjust power response of a PRU Alert.

TABLE 1

| Value (Bit) | Description |
| --- | --- |
| 0000 0000 | Permitted without reason |
| 0000 0001 | Permitted with waiting time due to limited available power |
| 1000 0000 | Denied due to cross connection. |
| 1000 0001 | Denied due to limited available power |
| 1000 0010 | Denied due to limited PTU Number of Devices |
| 1000 0011 | Denied due to limited PTU Class support |
| 1000 0100 | Denied due to high temperature at PTU |
| All other values | RFU |

TABLE 2

| 7 | 6 | 5 | 4 | 3 | 2 | 1 | 0 |
| --- | --- | --- | --- | --- | --- | --- | --- |
| NFC receiver | Separate BTLE radio in PRU | Power Control Algorithm Preference | Adjust power capability | Charge Complete Connected Mode | PTU Test Mode | RFU | RFU |
| 0 = Not supported 1 = Supported | 0 = Not supported 1 = Supported | 0 = $V_{RECT\_MIN\_ERROR}$ 1 = Max | 0 = Not supported 1 = Supported | 0 = Not supported 1 = Supported | 1 = Yes 0 = No | | |

TABLE 3

| 7 | 6 | 5 | 4 | 3 | 2 | 1 | 0 |
| --- | --- | --- | --- | --- | --- | --- | --- |
| Over-voltage | Over-current | Over-temp | PRU Self Protection | Charge Complete | Wired Charger Detect | PRU Charge Port | Adjust Power Response |

Power sharing mode may be applied when the PTU does not have enough power to supply P_RECT_MAX to all devices that require power, and a PTU may allow power allocation for multiple devices. The PTU must support power sharing mode.

When the PRU initiating new power transfer completes device registration with the PTU, before the PTU transmits a control characteristic for power transfer to the PRU, it may adjust the power transfer amount for the existing PRUs that are currently receiving power from the PTU (so that the new PRU may draw power).

When power adjustment is required, the PTU may configure the control characteristic to '0000 0001' and send it to the new PRU. In addition, a power control characteristic command for power adjustment may be transmitted to all PRUs currently receiving power.

If the PTU cannot support the P_RECT_MAX request of the new device, and the new PRU supports power adjustment, the power adjustment command reduces the PRECT to a range that the PTU can support, and the PTU may send an appropriate power adjustment command. The PTU may wait for 'Adjust power response' in the PRU dynamic parameter from the new PRU. The new PRU may adjust the power as requested by the PTU, and configure the 'Adjust power response' bit to '1'. When the PTU receives the 'Adjust power response', the PTU may configure and send a PRU control characteristic permission to '0000 0000' to the new PRU and start power transfer.

Examples described with reference to FIGS. 5 to 7 are applicable to a device conforming to the A4WP, but is not necessarily limited thereto and is applicable to various wireless power transfer devices.

Figure 8:
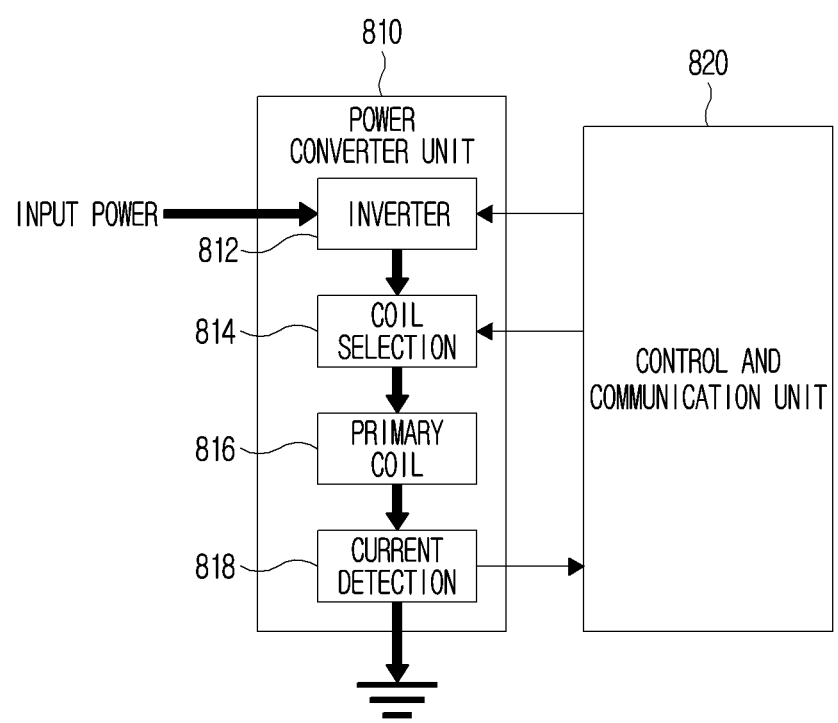
FIG. 8 is a diagram for describing the structure of a device to which the present disclosure is applicable.

FIG. 8 is a diagram for describing the structure of a device to which the present disclosure is applicable.

A power conversion unit 810 may send and receive signals to and from a control and communications unit 820.

When input power is applied to the power conversion unit 810, the inverter 812 may convert the DC input into an AC waveform that drives a resonant circuit composed of the primary coil 816 and a series capacitor. The coil selection module 814 may control power transfer by connecting the appropriate primary coil, executing the relevant power control algorithms and protocols, and driving the input voltage of the AC waveform. The operation of the inverter 812 and the coil selection module 816 may be performed based on information or commands from the control and communication unit 820. The primary coil 816 may convert current into magnetic flux. The current sensing module 818 may transmit the sensed current value to the control and communication unit 820.

The primary coil of the power transfer side may be designed according to a predetermined method. For example, according to the reference design, Type A (A1 to A33) and Type B (B1 to B6) for the Base Power Profile are presented, and also for the Extended Power Profile MP-A1 to MP-A4 may be presented.

Figure 9:
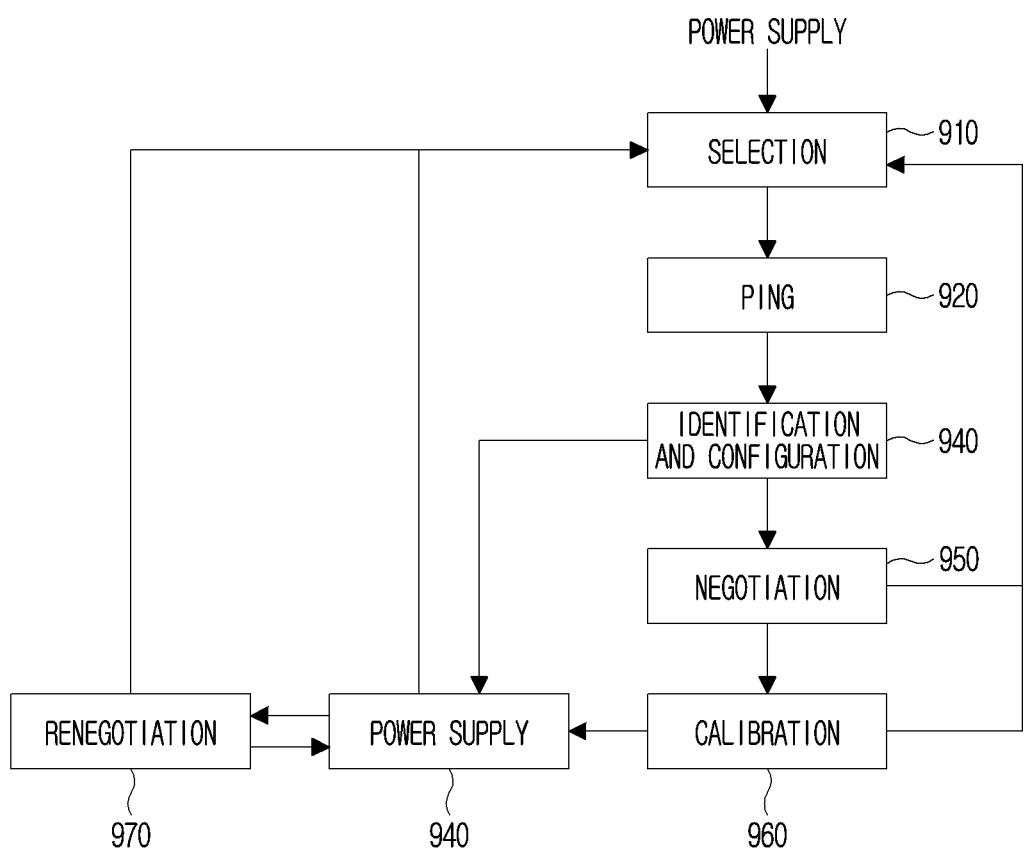
FIG. 9 shows an example of a state transition diagram of a device of a wireless power transfer system to which the present disclosure is applicable.

FIG. 9 shows an example of a state transition diagram of a device of a wireless power transfer system to which the present disclosure is applicable.

When power is supplied to the power transmission side (PTx), a selection state is entered 910.

As the object is detected, it may move to a ping state (920). Object sensing or detection may be, for example, sensing that a powered receiving (PR) device is placed on a powered transmitting device (e.g., a pad).

When the PTx normally receives a signal strength packet transmitted by the power receiving side (PRx), it may enter an identification & configuration state (930). In this state, the PTx may receive a configuration packet from the PRx, identify parameters necessary to perform wireless power transfer and communication, and generate a power transfer contract. For example, the PTx may generate an initial power transfer contract, based on guaranteed Power, maximum Power, received power packet format, frequency shift keying (FSK) polarity/modulation depth information, etc. through configuration packet. Based on the generated power transfer contract, the PTx and the PRx may perform wireless power transfer in a power transfer state.

In the identification and configuration state, the PTx may receive an identification packet from the PRx, if the PTx supports the identification packet, it may send an ACK or NACK to the PRx in response, and if the identification packet is not supported, a Not-Defined (ND) message may be sent to the PRx. The PTx may transition to a power transfer state when the PRx supports wireless power transfer based on the value of the identifier field of the identification packet and the identifier value is verified (940).

When a foreign object detection (FOD) extension function is supported, the PTx may transition to a negotiation state (950). In the negotiation state, it may perform fine-tuning of the power transfer contract between the PTx and the PRx. Specifically, the PRx transmits a negotiation request to the PTx, and the PTx may grant or deny this request. In order to improve the initial evaluation of the case when a foreign object exists, the PTx may compare the quality factor reported by the PRx with the result measured by the PTx itself, and in the case of foreign object detection (FOD), it may return a selection state.

When the PTx receives a specific request (SR) packet for negotiating a change in the power transfer contract transmitted by the PRx, the PTx may transition to a calibration state (960). PTx may improve the ability to detect foreign objects during power transfer and may adjust parameters related to power loss. In this regard, PRx may provide information on received power in different load conditions. It may also return to the selected state when it transitions to the power transfer state, or when calibration fails or an error occurs, based on SR packets, general request packets, FOD status packets, proprietary packets, reserved packets, etc. in the remediation state.

Meanwhile, in order to adjust the power transfer contract in the power transfer state, it may transition to a renegotiation state initiated by the PRx (970). When the renegotiation is completed, it may transition back to the power transfer state.

When the PTx transmits a control error packet, received power, charge status, and end power transfer from the PRx, the PTx may transition back to the selection state.

In addition, in transitioning from the negotiation 950, renegotiation 970 and/or remediation 960 states to the power transfer 940 state, OOB (e.g., BLE) connection may be established and authentication may be performed based on OOB. For example, power transfer may be performed through power control, FOD, and authentication only through BLE in the negotiation state. Alternatively, power control, FOD, and authentication may be performed through BLE in a negotiation state, and coil and PRx detection may be performed in-band to perform power transfer. Alternatively, in the negotiation state, power control and FOD are performed in-band, and some other information may be authenticated through BLE. Alternatively, power control, FOD (and authentication) may be performed only in-band.

Figure 10:
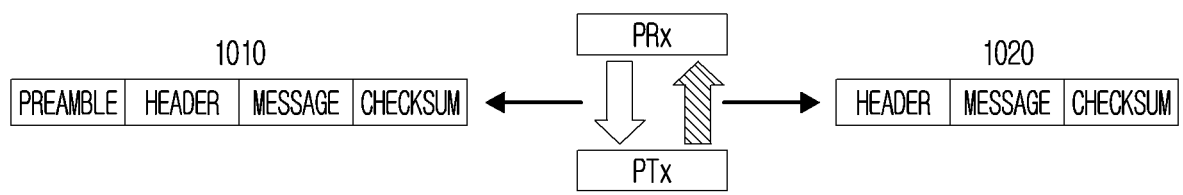
FIG. 10 shows an example of an in-band communication interface of a wireless power transfer system to which the present disclosure is applicable.

FIG. 10 shows an example of an in-band communication interface of a wireless power transfer system to which the present disclosure is applicable.

A packet transmitted from the PRx to the PTx may be configured using an amplitude modulation method of a power signal (1010). Such a packet structure may include a preamble, a header, a message, and a checksum.

The header includes a packet type, and the type and content of the corresponding message are as follows.

Signal Strength: The degree of coupling between the primary and secondary coils

End Power Transfer: including the reason for the interruption (e.g., over voltage, over temperature, etc.)

Power Control Hold-off: the amount of time the PTx must wait (e.g. in ms)

Configuration: Power Class, Maximum Power Value, etc. (See Table 4)

In addition, identification, extended identification, general request, specific request, foreign object detection Status (FOD), control error, charge status (e.g., 0-100%), renegotiate, receive power (e.g., it may be defined as 24-bit size or 8-bit size), proprietary information, etc. may be included.

Table 4 shows an exemplary structure of a message of a configuration packet.

TABLE 4

| | $b_7$ | $b_6$ | $b_5$ | $b_4$ | $b_3$ | $b_2$ | $b_1$ | $b_0$ |
|---|---|---|---|---|---|---|---|---|
| $B_0$ | Power Class | | | | Maximum Power Value | | | |
| $B_1$ | Reserved | | | | | | | |
| $B_2$ | Prop | Reserved | | | ZERO | Count | | |
| $B_3$ | Window Size | | | | | Window Offset | | |
| $B_4$ | Neg* | Polarity* | | Depth* | | Reserved | | |

Next, a packet transmitted from the PTx to the PRx may be configured in a frequency shift keying method (1020). This packet structure may include a header, a message, and a checksum.

The header includes the packet type, and the types and corresponding message contents may include power transmitter data not available, power transmitter identification (Version), power transmitter capability (proprietary) and the like. Power transmitter capabilities may include guaranteed power (e.g., the amount of output power of an appropriate reference power receiver that the power transmitter is certain to be available at any point during the power transfer phase) and potential power (e.g., amount of output power by an appropriate reference power receiver that the power transmitter may make available during the power transfer phase).

Additionally, for OOB (e.g. BLE) connection, at the configuration stage and/or negotiation stage, information such as OOB flag in PRx's setup packet (that is, notify PTx of whether PRx supports OOB), OOB flag in PTx's capability packet (that is, notifies PRx of whether PTx supports OOB), OOB address of PRx (i.e., notifying PTx of OOB address of PRx through in-band), OOB address of PTx (that is, notify PRx of OOB address of PTx through in-band), and SRQ/communication packets (i.e., PTx and PRx decide whether to communicate with each other OOB and/or in-band) and the like may be exchanged.

Next, an additional example of the power sharing mode will be described.

In shared mode, the PTx may determine the total magnetic force that can be shared among all the PRx it is servicing. Here, PTx may allow the current passing through the primary coil to be maintained at a constant level. The PRx may change the amount of power it will receive from the magnetic field by adjusting the appropriate impedance. If the PRx cannot adjust the impedance, the PRx may offer to the PTx to increase or decrease the amount of power that the PRx can use. For this, a communication protocol mechanism for synchronizing PTx and PRx may be provided in the proposal of PRx.

In the Exclusive Mode, the power transmitter may provide only one power receiver at a time. For power transmitter products (PTP) and power receiver products (PRP), after the power transfer from the PTP to the first PRP is complete (for example, after the PRP's battery is fully charged), user may manually change to the next PRP. To provide a better user experience, PTP may support multiple PRPs or implement a mechanism to automatically select the next PRP. For example, it may select one of the arrangement of a plurality of primary coils, or to physically move the primary coil from one PRP to the next PRP. Alternatively, a PTP may include multiple PTx implementations, with each PTx acting as a single PTP while simultaneously transferring power to multiple PRPs.

In the shared mode, the power transmitter may support multiple power receivers at the same time, but this is only possible when all of the PRx support the shared mode. In the case of PTP and PRP, this means that the user may place multiple shared mode PRPs on the surface of shared mode PTPs at the same time. Therefore, a user may charge a plurality of PRPs without replacing them to complete charging (however, there is a limit to the number of PRPs that a PTP can process at the same time). However, if the PTP contains only one PTx and the user places a mix of shared and exclusive mode PRPs on the surface of the PTP, the PTP may need to power the PRP in a sequential mode of operation. Depending on the configuration of the PTx, the user may need to rearrange the PRP for power transfer. For example, if the PTx uses a single primary coil, the user may have to manually replace each PRP after power transfer is complete. Alternatively, if the PTx uses a Primary Coil arrangement, it may automatically select an appropriately placed coil to service the next PRP. That is, the PTP may first service all the shared mode PRPs at the same time, and then sequentially charge the remaining exclusive mode PRPs.

Figure 11:
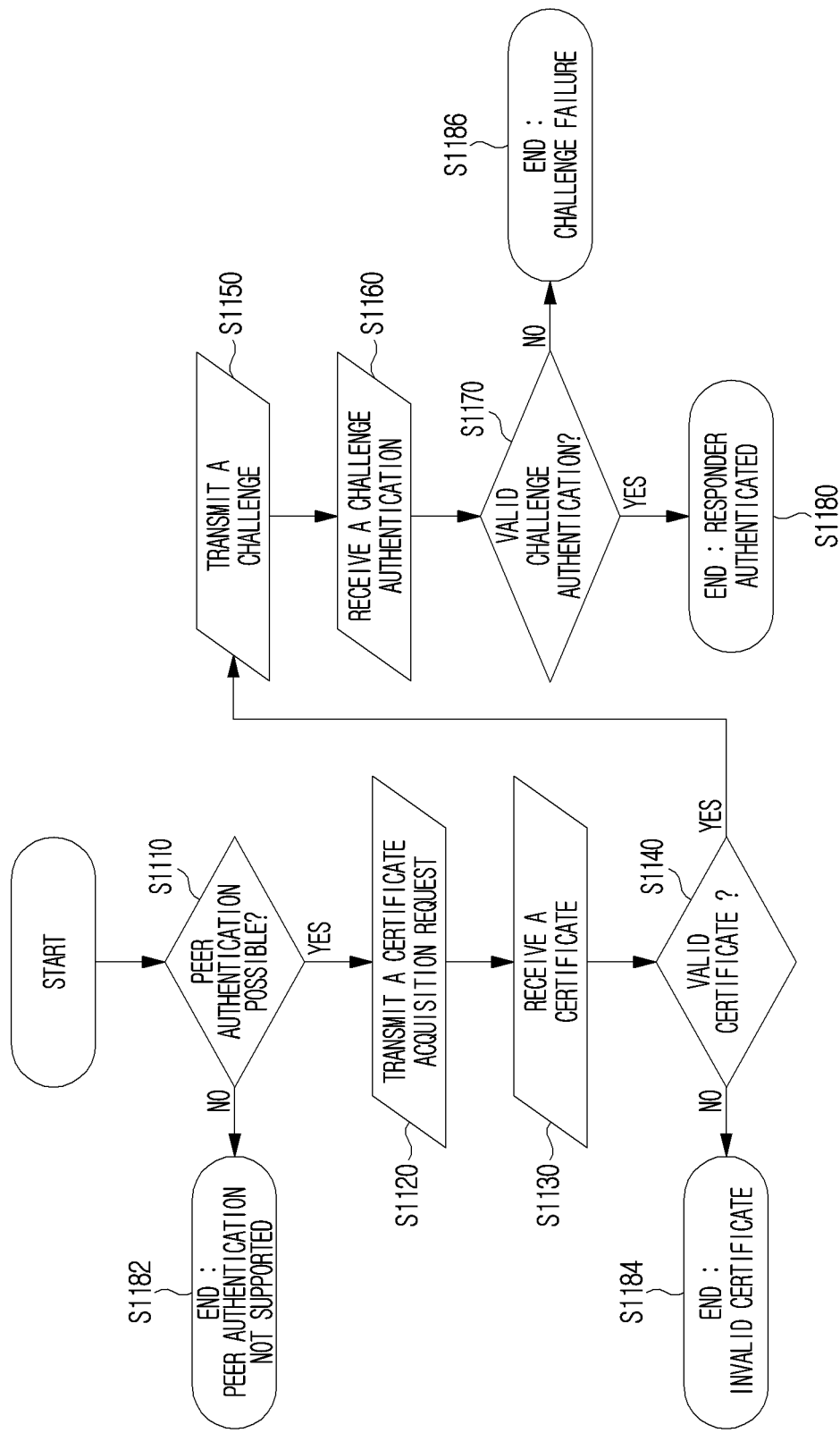
FIG. 11 is a diagram exemplarily illustrating an authentication process in a wireless power transfer system to which the present disclosure is applicable.

FIG. 11 is a diagram exemplarily illustrating an authentication process in a wireless transfer power system to which the present disclosure is applicable.

FIG. 11 illustrates a process in which an authentication initiator device authenticates an authentication responder device.

The initiator may check whether a peer device can perform authentication (S1110). That is, it may determine whether the peer device can be a responder. If the peer device does not support authentication, the procedure may end (S1182). If the peer device supports authentication, the initiator may transmit a certificate acquisition request (GET_CERTIFICATE) message in slot 0 to the responder (S1120), and receive a CERTIFICATE message from the responder (S1130).

Next, the initiator may verify the validity of a certificate received from the responder (S1140). For example, it may be determined whether a certificate chain associated with a received certificate is validly signed. In the case of an invalid certificate, the procedure may be terminated (S1184). In the case of a valid certificate, the initiator may transmit a CHALLENGE to the responder in slot 0 (S1150) and receive a challenge authentication (CHALLANGE_AUTH) from the responder (S1160). In this case, the responder may transmit CHALLANGE_AUTH signed with its private key to the initiator.

Next, the initiator may determine whether the CHALLANGE_AUTH received from the responder is valid (S1170). For example, the initiator may verify that the challenge signature received from the responder is valid. In the case of an invalid signature, the challenge may be processed as failed and authentication for the responder may also be processed as failed (S1186).

In the case of a valid signature, authentication of the responder may be completed (S1180).

The above-described examples described with reference to FIGS. 8 to 11 are applicable to, but not necessarily limited to, devices compliant with WPC, and are applicable to various wireless power transfer devices.

Hereinafter, examples of a new protocol for transmitting and receiving information related to wireless power transfer according to the present disclosure will be described. The following examples may be applied to various wireless power transfer technologies that are not limited to A4WP, WPC, etc., and may be applied to various wireless communication technologies that are not limited to BLE, etc. that support OOB communication of a wireless power transfer system.

Figure 12:
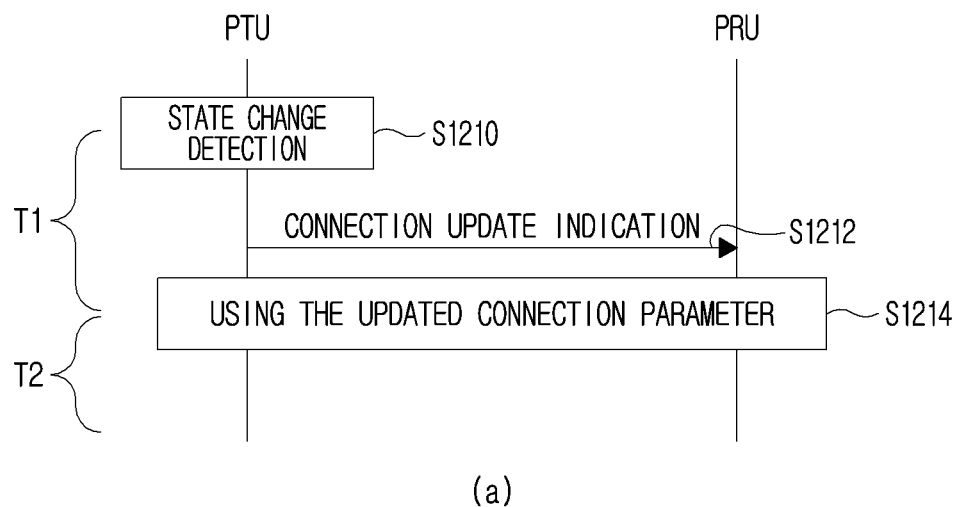
FIG. 12 is a diagram for describing a wireless communication connection method according to a state change to which the present disclosure is applicable.
Figure 12:
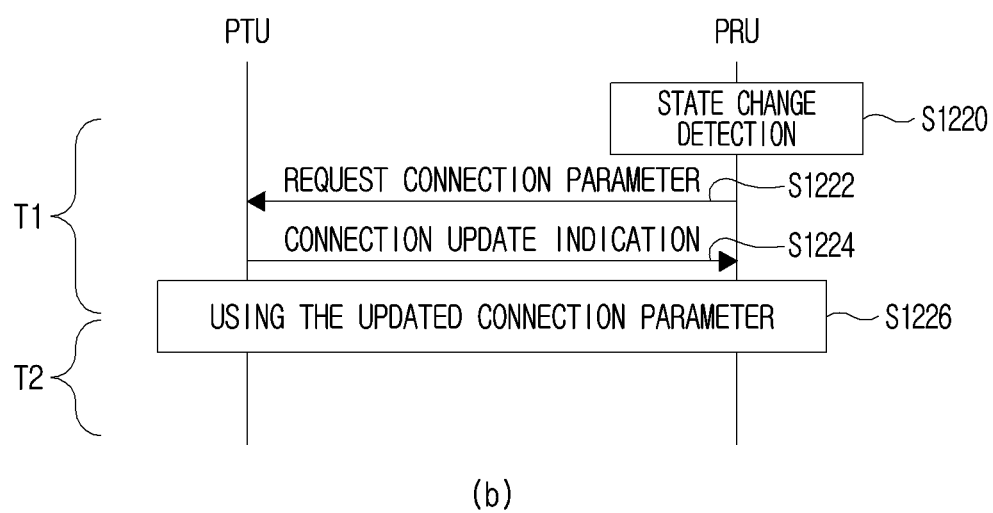

FIG. 12 is a diagram for describing a wireless communication connection method according to a state change to which the present disclosure is applicable.

In the wireless power transfer operation, it may be required to quickly change the configuration between the PTU and the PRU according to an external situation change such as a user suddenly changing the location of the PRU. In order to quickly respond to such a situation, a method of detecting whether a wireless communication connection configuration change is necessary and quickly changing the connection configuration accordingly will be described.

FIG. 12(a) is a case in which the PTU detects a state change, and FIG. 12(b) is a case in which the PRU detects a state change. For example, criteria such as a predetermined maximum/minimum threshold or range for a state to be detected are preconfigured, and the PTU or PRU may check the status value periodically or on an event-based basis, and it may be determined that the state change has occurred when the checked state value deviates from the criteria.

In the example of FIG. 12(a), the state change detection of the PTU (S1210) may include the PTU detecting a magnetic field change, an impedance change, a temperature change of the PRU, a temperature change of the PTU, a foreign object detection (FOD), an illegal data packet, and the like. In addition, detecting the state change by the PTU may further include detecting that the efficiency of power transfer is decreasing by the PTU.

If the PTU detects a state change, the PTU may transmit a connection update indication to the PRU (S1212). For example, the connection update indication may be the LL_CONNECTION_UPDATE_IND message described with reference to FIGS. 3 and 4. Accordingly, the connection parameter between the PTU and the PRU may be updated, and the connection between the PTU and the PRU may be re-established, resumed, or maintained using the updated parameter (S1214).

In the example of FIG. 12(b), the state change detection of the PRU (S1220) may include the PRU detecting a magnetic field change, an impedance change, a temperature change of the PRU, a temperature change of the PTU, an FOD, an illegal data packet, and the like. In addition, the case where the PRU detects a state change may further include a case in which the PRU detects that the relative position with the PTU (e.g., the distance from the PTU, the position from the reference point of the PTU) is changed and a case in which the PRU detects that its own location is changed (e.g., a change in a detection value of a sensor (e.g., a gyro sensor) of the PRU). In addition, the case in which the PRU detects a state change may further include a case where the PRU needs more power than before and a case where the application of the PRU has a request (e.g., when the PRU uses an audio service during wireless charging, an update of connection parameters may be required in order for the wireless charging service and the audio service to operate smoothly at the same time).

If the PRU detects a state change, the PRU may transmit a connection parameter request message to the PTU (S1222). For example, the connection parameter request message may be the LL_CONNECTION_PARAM_REQ message in the examples of FIGS. 3 and 4. In response, the PRU may receive a connection update indication message from the PTU (S1224). For example, the connection update indication message may be the LL_CONNECTION_UP-DATE_IND message described with reference to FIGS. 3 and 4. Accordingly, the connection parameter between the PTU and the PRU may be updated, and the connection between the PTU and the PRU may be re-established, resumed, or maintained using the updated parameter (S1226).

In the above-described examples, a predetermined timer (e.g., T1) may be applied from the time of detecting a state change of the PTU or PRU to the time of establishing a connection using the updated parameter. That is, it is required to complete the connection parameter update after the state change is detected within a predetermined timer, so that the parameter update may be quickly performed adaptively to the changed situation. If the update of the connection parameter is not completed before the predetermined timer expires, the PTU or PRU may stop transmitting or receiving power, or perform the connection update process again while transmitting or receiving only a minimum amount of power.

In addition, after the connection parameter update triggered by the PTU or PRU, the PTU or PRU may measure the status for a predetermined timer (e.g., T2). This is because the changed state may remain as it is, may lead to an additional state change, or the state change may be temporary. If the changed state is maintained for a predetermined timer, the connection based on the updated parameter may be maintained. If a state change additionally occurs within a predetermined timer, a connection parameter update process triggered by the PTU or PRU according to the additionally changed state may be additionally performed. If the state returns to the previous normal state within a predetermined timer, the connection may be re-established, resumed, or maintained by changing to a basic connection parameter through a connection parameter update process triggered by the PTU or PRU.

As an additional example, in the existing BLE, connection-related parameters such as connection interval and slave latency may be configured when establishing a connection and used in communication in a connected state. In order to update a connection parameter during communication, a connection update procedure may be performed to change the connection parameter. In the connection update process, in order to apply the new connection parameter, Tx and Rx must reconfigure the anchor point related to when to apply the newly updated connection parameter, etc. and it is necessary for the Tx and the Rx to check whether the new connection parameter is actually ready to be applied between the Tx and the Rx. Because it takes a long time, it is not suitable for application to a wireless charging system. Therefore, the connection update may be performed quickly based on the information already exchanged between the Tx and the Rx, without the need to reconfigure the anchor point using a sub-rating parameter (e.g., connection parameter update information exchanged in advance between Tx and Rx may be exchanged, application time).

In addition, while performing communication using the connection parameters initially set between the PTU and the PRU, when the situation changes, such as when the user moves the PRU, the PTU and the PRU may need to exchange information within a short latency by changing the connection parameters. In this case, it is possible to change parameters by performing the existing connection update procedure, but since the parameter change time required by the wireless charging system requires more urgency, there is a need to use an enhanced connection update. Unlike the existing method, the improved connection update procedure may change connection parameters while minimizing the configuration of a new anchor point and addition of a new link layer message by exchanging sub-rate values in advance.

Since the improved connection update process can reduce the time required to change the connection interval, it may be usefully applied to applications using dynamic bandwidth requirements required to transmit data with low power and low latency.

Here, the sub-rate means a factor applied to the current connection interval, and the sub-rate may correspond to a lower rate than a general rate. That is, in a sub-rate connection, an interval that is longer than a general connection interval may be applied. The slave latency may indicate a value to be used for a new connection after change. For example, in a sub-rate connection, a slave may be available at a time point (e.g., in ms) of 'connection interval*sub-rate*(latency+1)'.

Hereinafter, a connectionless asset tracking service to which the present disclosure is applicable will be described.

Figure 13:
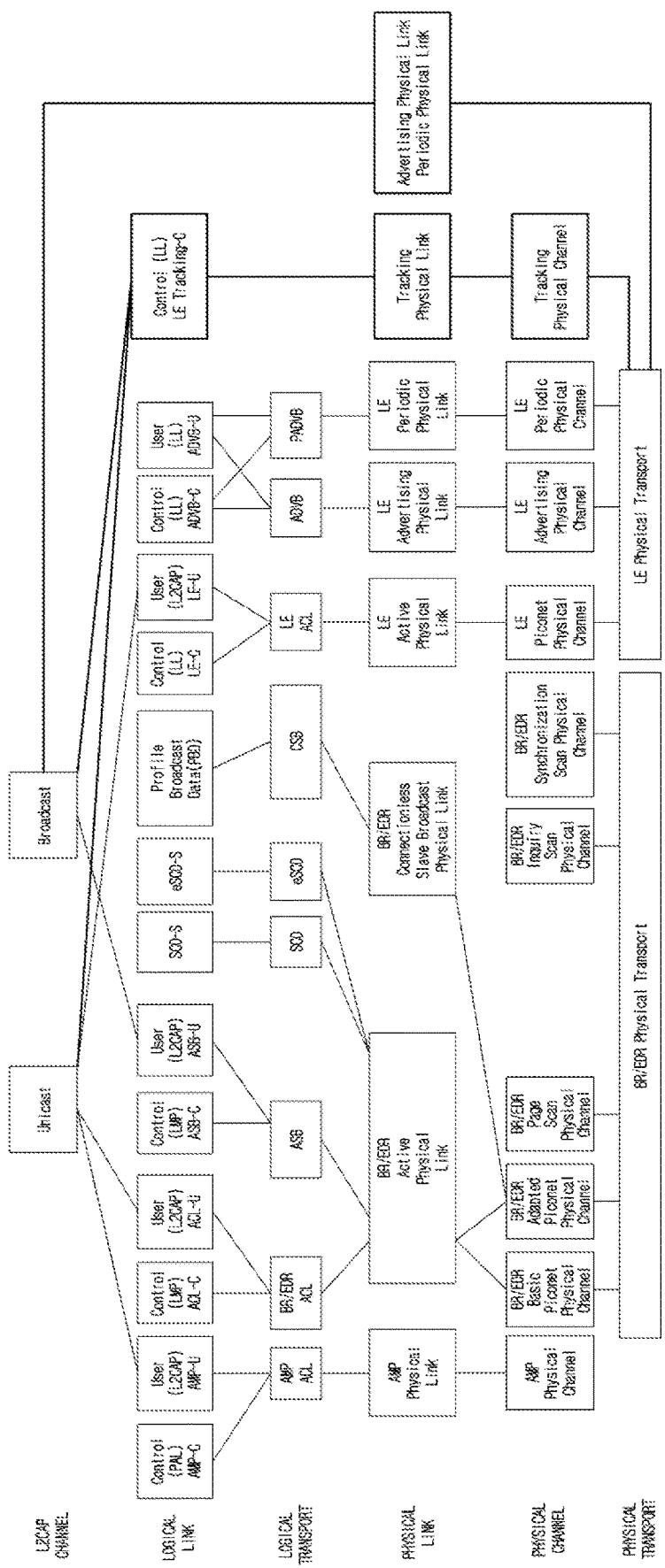
FIG. 13 is a diagram illustrating an example of Bluetooth transmission architecture entities and a hierarchical structure to which the present disclosure is applicable.

FIG. 13 is a diagram illustrating an example of Bluetooth transmission architecture entities and a hierarchical structure to which the present disclosure is applicable.

FIG. 13 exemplarily shows entities on a Bluetooth architecture for supporting asset tracking according to the present disclosure. Asset tracking means tracking a physical object, and may include localization or location estimation. Specifically, FIG. 13 discloses entities newly defined to support angle of arrival (AoA)-based asset tracking, which cannot be supported only by existing entities, and a degree of association between these entities.

For example, Control (LL) LE Tracking-C may be defined to perform tracking-related control in a logical link. The tracking physical link may be defined to perform an operation related to tracking in a physical link. Advertising Physical Link and Periodic Physical Link may be defined to perform advertising and periodic transmission related to tracking in a physical link, respectively. The Tracking Physical Channel may be defined to perform an operation related to tracking in a physical channel. For example, the Tracking Physical Channel entity may determine which channel among three advertising channels to use for tracking purposes, and at what timing to perform tracking-related signal transmission/reception, and the like. A detailed operation of each object will be described later.

Figure 14:
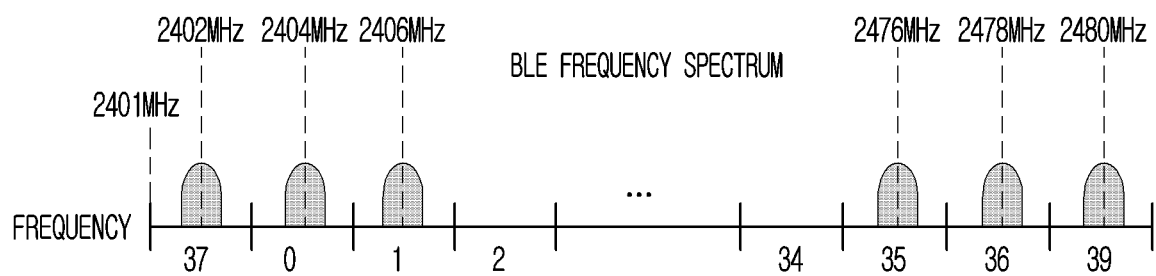
FIG. 14 is a diagram illustrating an example of a BLE physical channel to which the present disclosure is applicable.

FIG. 14 is a diagram illustrating an example of a BLE physical channel to which the present disclosure is applicable.

For example, 40 channels may be defined in the BLE frequency spectrum, and the location and channel number of the center frequency of each channel are shown in FIG. 14.

Among the 40 channels, channel indexes 37, 38 and 39 are defined as advertising channels, and channel indexes 0, 1, . . . , 36 are defined as data channels. Table 5 below shows the mapping relationship between the RF channel, the data channel index, and the advertising channel index.

TABLE 5

| RF Channel | RF center frequency | Channel type | Data channel index | Advertising channel index |
|---|---|---|---|---|
| 0 | 2402 MHz | Advertising channel | — | 37 |
| 1 | 2404 MHz | Data channel | 0 | — |
| 2 | 2406 MHz | Data channel | 1 | — |
| ... | ... | Data channels | ... | — |
| 11 | 2424 MHz | Data channel | 10 | — |
| 12 | 2426 MHz | Advertising channel | — | 38 |
| 13 | 2428 MHz | Data channel | 11 | — |
| 14 | 2430 MHz | Data channel | 12 | — |
| ... | ... | Data channels | ... | — |
| 38 | 2478 MHz | Data channel | 36 | — |
| 39 | 2480 MHz | Advertising channel | — | 39 |

Referring back to the LL packet format of FIG. 2(a), a preamble having a length of 1 octet may have a value of 10101010b or 01010101b. Specifically, the preamble of the advertising channel packet may have a value of 10101010b. The preamble of the data channel packet may have a value of 10101010b or 01010101b according to the LSB value of the access address.

An access address of 4 octets length may have a value of 10001110100010011011111011010110b (i.e., 0x8E89B-ED6) in the case of all advertising channel packets. The access address of the data channel packet may have a different value for each LL connection.

A 3-octet-long CRC may have the value of a 24-bit checksum calculated for the PDU.

A PDU may include a header and a payload as shown in FIG. 2(b). The header may include PDU Type (4 bits), RFU (2 bits), Transmitter Address (1 bit), Receiver Address (1 bit), Length (6 bits), and RFU (2 bits) fields. Here, the name of the packet or PDU indicated according to the value of the PDU type field may be given as shown in Table 2 below.

TABLE 6

| PDU Type (b3 b2 b1 b0) | Packet name |
|---|---|
| 0000 | ADV_IND |
| 0001 | ADV_DIRECT_IND |
| 0010 | ADV_NONCONN_IND |
| 0011 | SCAN_REQ |
| 0100 | SCAN_RSP |
| 0101 | CONNECT_REQ |
| 0110 | ADV_SCAN_IND |
| 0111-1111 | Reserved |

In the example of Table 6, when the value of the PDU type field is 0000, ADV_IND, which is a representative advertising packet, may be indicated. Alternatively, when the value of the PDU type field is 0101, CONNECT_REQ used for a connection request may be indicated.

Alternatively, the PDU name indicated according to the value of the PDU type field may be defined as shown in Table 7 below.

TABLE 7

| PDU Type | Packet name |
|---|---|
| 0000b | ADV_IND |
| 0001b | ADV_DIRECT_IND |
| 0010b | ADV_NONCONN_IND |
| 0011b | SCAN_REQ |
| | AUX_SCAN_REQ |

TABLE 7-continued

| PDU Type | Packet name |
|---|---|
| 0100b | SCAN_RSP |
| 0101b | CONNECT_REQ |
| | AUX_CONNECT_REQ |
| 0110b | ADV_SCAN_IND |
| 0111b | ADV_EXT_IND |
| | AUX_ADV_IND |
| | AUX_SCAN_RSP |
| | AUX_SYNC_IND |
| | AUX_CHAIN_IND |
| 1000b | AUX_CONNECT_RSP |
| all other values | Reserved for future use |

The PDU type values shown in Table 6 or 7 are merely exemplary, and in order to distinguish the PDUs, the PDU type values and the PDU names mapped thereto may be defined in various ways.

Figure 15:
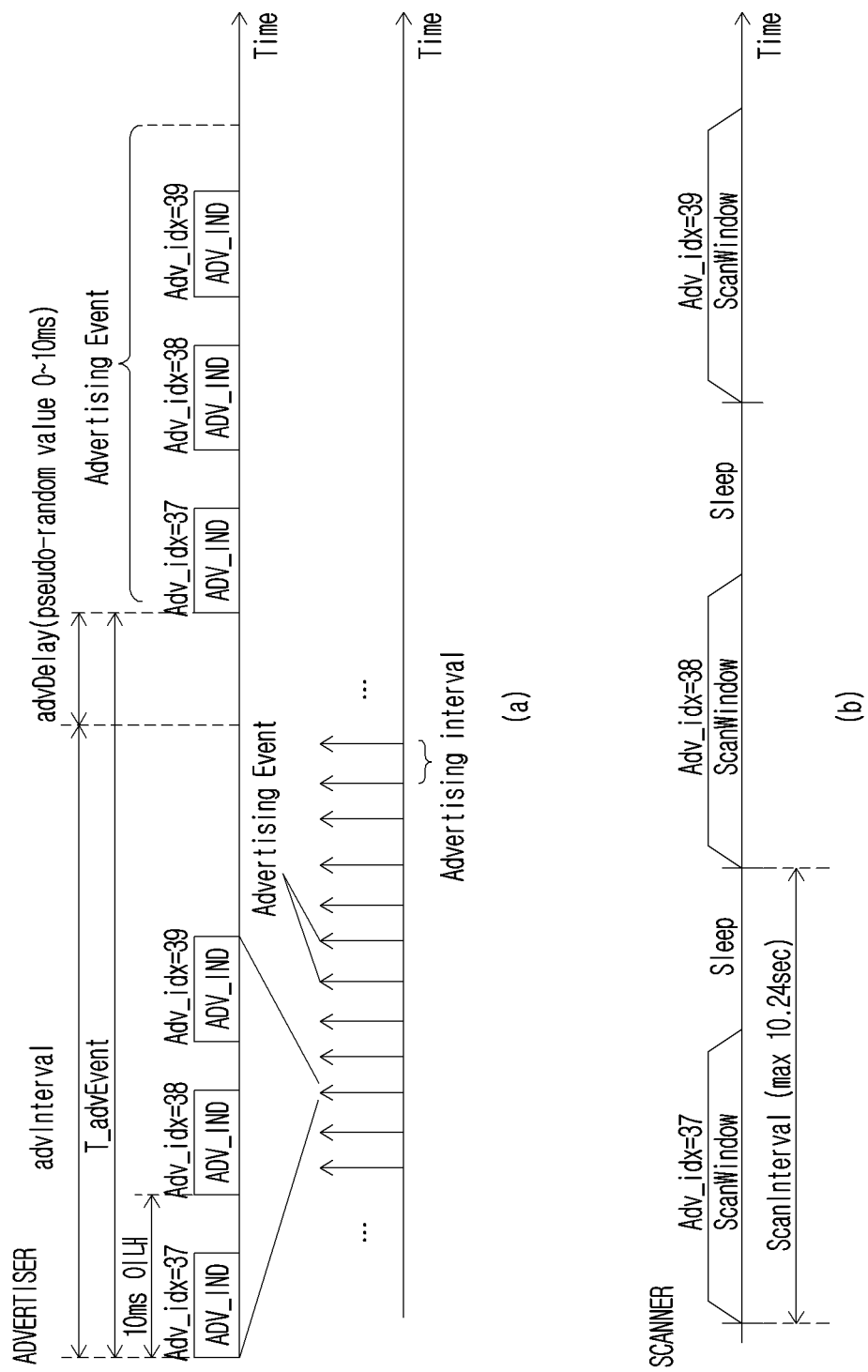
FIG. 15 is a diagram illustrating an example of a BLE physical channel operation to which the present disclosure is applicable.

FIG. 15 is a diagram illustrating an example of a BLE physical channel operation to which the present disclosure is applicable.

The example of FIG. 15 shows operations of an advertiser and a scanner in the time domain.

In FIG. 15(a), an advertising event may occur at a predetermined advertising interval.

In one advertising event, the advertiser may transmit an ADV_IND packet on an advertising channel (e.g., channel indexes 37, 38, 39). The ADV_IND packet transmission interval may be, for example, within 10 ms. Another advertising event that follows may occur after a T_advEvent time period from the start of one advertising event, and T_advEvent may include an advInterval and advDelay period. advDelay may be configured to a pseudo-random value between 0 and 10 ms.

In FIG. 15(b), the scanner may repeat the scanning operation for a predetermined time interval (e.g., ScanInterval of up to 10.24 seconds). In one scanning interval, the scanner may perform scanning on one advertising channel for a scan window time and may switch to a sleep mode. For example, it may operate like sleep after scanning on advertising channel 37, sleep after scanning on advertising channel 38, and sleep after scanning on advertising channel 39.

FIG. 16 shows an exemplary HCI packet format to which the present disclosure is applicable.

As described with reference to FIG. 1, the Bluetooth device may include a host layer and a controller layer, and the interface layer between the host and controller layer is called a Host Controller Interface (HCI).

HCI provides a uniform way for the host to access the capabilities of the controller. Communication through the HCI interface takes the form of a packet. The host may transmit an HCI command packet to the controller and asynchronously receive notification from the controller using an HCI event. A packet transmitted/received on the HCI interface may have one of four types. The four types are defined as HCI command packet, HCI asynchronous data packet, HCI synchronous data packet, and HCI event packet.

Figure 21:
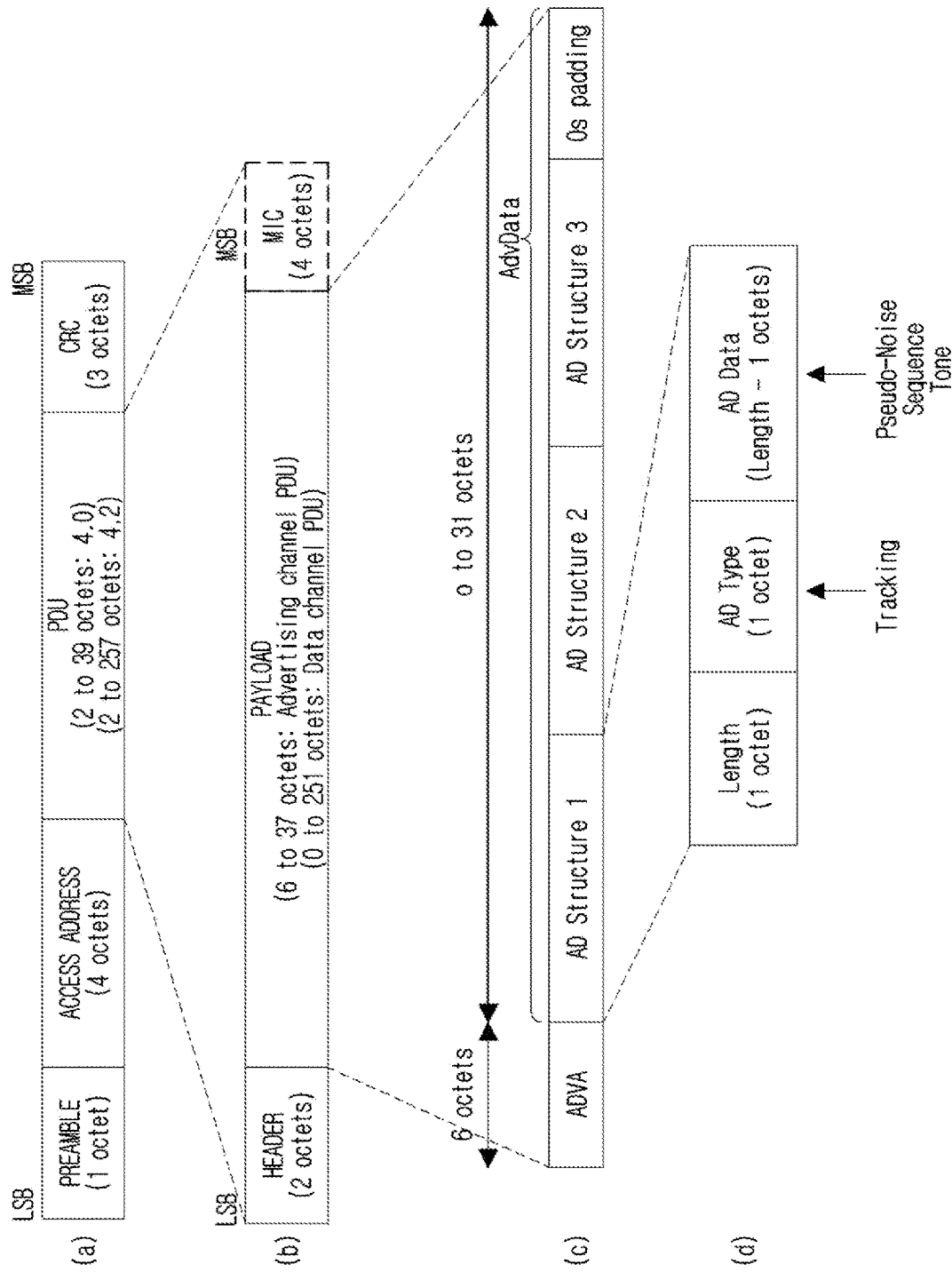
FIG. 21 is a diagram for describing an example of an advertising packet to which the present disclosure is applicable.

FIG. 16 (a) shows an example of an HCI command packet format, and FIG. 21 (b) shows an example of an HCI event packet format.

The HCI command packet as in the example of FIG. 16(a) is used by the host to send a command to the controller.

Each command is assigned a unique OpCode with a size of 2 bytes (or octets), and the OpCode is divided into two fields OGF (OpCode Group Field) and OCF (OpCode Command Field). OGF is used to group similar OpCodes, and OCF is used to identify a specific instruction within an OpCode group.

The 1-byte parameter total length field specifies the total length of all parameters included in the remaining part of the HCI command packet in units of octets. Following the parameter full length field, one or more command parameters may be included.

The HCI event packet as in the example of FIG. 16(b) is used by the controller to notify the host when an event will occur. The HCI event may be generated as a response to an HCI command previously transmitted from the host, or due to another event (e.g., error occurrence, disconnection, connection request reception, etc.).

The HCI event packet includes an event code field with a size of 1 byte. The event code may include a value identifying an event that has occurred.

The 1-byte parameter total length field specifies the total length of all parameters included in the remaining portion of the HCI event packet in units of octets. Following the parameter full length field, one or more event parameters may be included.

Although not shown in FIG. 16, HCI asynchronous data packets may be used to exchange data between a host and a controller, and may be exchanged after a connection is established. HCI synchronous data packets are used to exchange synchronous data between the host and the controller.

Table 8 below shows an example of an HCI command or event for connection encryption.

TABLE 8

Set Connection Encryption Command

| Command | OCF | Command parameter | Return parameter |
|---|---|---|---|
| HCI_Set_Connection_Encryption | 0x0013 | Connection_Handle, Encryption Enable | |

| Value | Parameter description |
|---|---|
| | Connection_Handle: Size: 2 Octets (meaningful 12 bits) |
| 0xXXXX | Connection_Handle Range: 0x0000 to 0x0EFF Encryption_Enable: Size: 1 Octet |
| 0x00 | Link level encryption OFF |
| 0x01 | Link level encryption ON |

The Set_Connection_Encryption (or HCI_Set_Connection_Encryption)

The Set_Connection_Encryption (or HCI_Set_Connection_Encryption) command may be used to enable and disable link level encryption.

The Connection_Handle command parameter may be used to identify another controller that is establishing a connection. Connection_Handle may be Connection_Handle for asynchronous connection. Encryption configuration may be applied to all Connection_Handle parameters having the same remote controller. While the encryption is changing, the Link Manager may stop all asynchronous traffic on the connection.

When both devices support both secure connection (controller support) and secure connection (host support) features, and encryption is currently enabled on a specific Connection_Handle, if the Encryption_Enable parameter is configured to a value indicating link level encryption OFF (Turn Link Level Encryption OFF), the controller may return an error code (e.g., 0x25) indicating Encryption Mode Not Acceptable.

When the controller receives the HCI_Set_Connection_Encryption command, the controller may transmit an HCI_Command_Status event to the host. When the link manager completes encryption enable/disable for the connection, the local controller may send an HCI_Encryption_Change event to the host, and the controller on the remote device may also generate an HCI_Encryption_Change event.

When various HCI commands such as the above-described example of HCI_Set_Connection_Encryption are designed, they may be implemented in software like the hci_map structure. Table 9 shows an example of the source code including the hci_map structure (e.g., BlueZ, which is an open source of the Bluetooth stack).

TABLE 9

```
typedef struct {
    char *str;
    unsigned int val;
} hci_map;
...
/* Command mapping */
static hci_map commands_map[ ] = {
    { "Inquiry",                           0    },
    { "Inquiry Cancel",                    1    },
    { "Periodic Inquiry Mode",             2    },
    { "Exit Periodic Inquiry Mode",        3    },
    { "Create Connection",                 4    },
    { "Disconnect",                        5    },
    { "Add SCO Connection",                6    },
    { "Cancel Create Connection",          7    },
    { "Accept Connection Request",         8    },
    { "Reject Connection Request",         9    },
    { "Link Key Request Reply",            10   },
    { "Link Key Request Negative Reply",   11   },
    { "PIN Code Request Reply",            12   },
    { "PIN Code Request Negative Reply",   13   },
    { "Change Connection Packet Type",     14   },
    { "Authentication Requested",          15   },
    { "Set Connection Encryption",         16   },
    { "Change Connection Link Key",        17   },
    { "Master Link Key",                   18   },
    { "Remote Name Request",               19   },
    { "Cancel Remote Name Request",        20   },
    { "Read Remote Supported Features",    21   },
    { "Read Remote Extended Features",     22   },
    { "Read Remote Version Information",   23   },
    ...
    { "Reserved",                          160  },
    { "Reserved",                          161  },
    { "Send Keypress Notification",        162  },
    { "IO Capability Request Negative Reply", 163 },
    { "Read Encryption Key Size",          164  },
    { "Reserved",                          165  },
    { "Reserved",                          166  },
    { "Reserved",                          167  },
    ...
```

A newly designed instruction may be added to the hci_map structure as in the example of Table 9. For example, as shown in Table 10, commands such as read_encrypt_key_size_cmd and read_encrypt_key_size_rsp may be additionally designed, and may be called and used through set_bredr_command.

TABLE 10

```
static void read_encrypt_key_size_cmd(const void *data, uint8_t size)
{
    const struct bt_hci_cmd_read_encrypt_key_size *cmd = data;
    print_handle(cmd->handle);
}
static void read_encrypt_key_size_rsp(const void *data, uint8_t size)
{
    const struct bt_hci_rsp_read_encrypt_key_size *rsp = data;
    print_status(rsp->status);
    print_handle(rsp->handle);
    print_key_size(rsp->key_size);
}
...
static void set_bredr_commands(struct btdev *btdev)
{
    set_common_commands_all(btdev);
    set_common_commands_bredr1e(btdev);
    set_common_commands_bredr20(btdev);
...
    btdev->commands[16] |= 0x08; /* Setup Synchronous Connection */
    btdev->commands[17] |= 0x01; /* Read Extended Inquiry Response */
    btdev->commands[17] |= 0x02; /* Write Extended Inquiry Response */
    btdev->commands[17] |= 0x20; /* Read Simple Pairing Mode */
    btdev->commands[17] |= 0x40; /* Write Simple Pairing Mode */
    btdev->commands[17] |= 0x80; /* Read Local OOB Data */
    btdev->commands[18] |= 0x01; /* Read Inquiry Response TX Power */
    btdev->commands[18] |= 0x02; /* Write Inquiry Reponse TX Power */
    btdev->commands[18] |= 0x80; /* IO Capability Request Reply */
    btdev->commands[20] |= 0x10; /* Read Encryption Key Size */
    btdev->commands[23] |= 0x04; /* Read Data Block Size */
    btdev->commands[29] |= 0x20; /* Read Local Supported Codecs */
    btdev->commands[23] |= 0x08; /* Get MWS Transport Layer Config */
} ? end set_bredr_command ?
...
```

Figure 17:
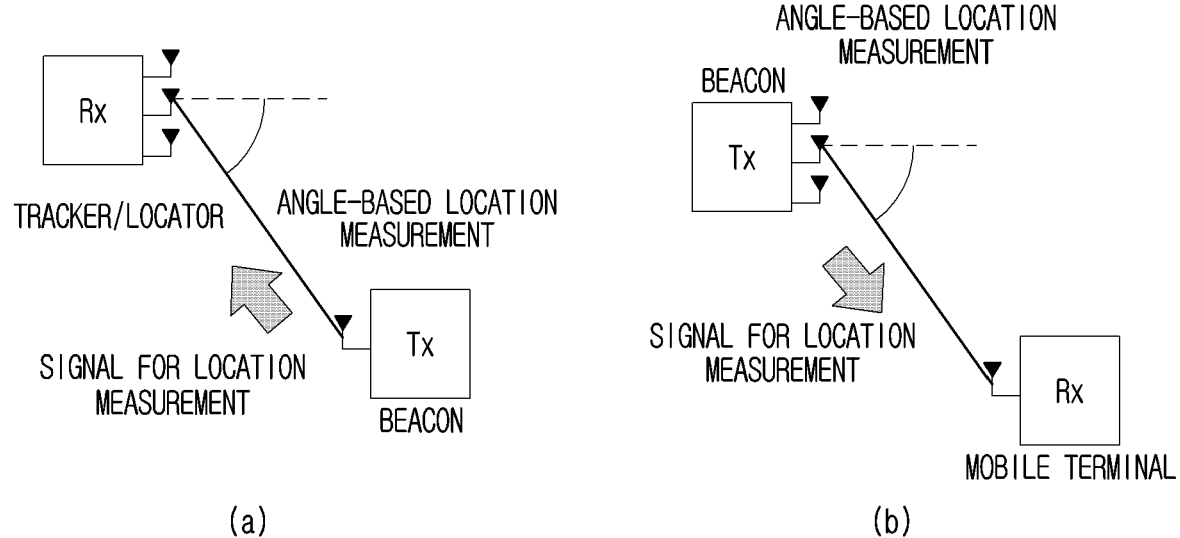
FIG. 17 is a diagram for describing an angle-based location measurement method to which the present disclosure is applicable.

FIG. 17 is a diagram for describing an angle-based location measurement method to which the present disclosure is applicable.

The angle-based location measurement method may include estimating or determining a location of a physical object based on an angle measured using signals received by or transmitted from multiple antennas.

In the example of FIG. 17(a), an example of localization using the angle of arrival AoA is shown. Specifically, a receiver such as a tracker or a locator may have a plurality of antennas. A transmitter such as a beacon may transmit a signal (e.g., a predefined signal, a reference signal, etc.) for location measurement. The receiver may measure an angle of a signal arriving at the receiver based on a phase difference between signals received through different antennas.

In the example of FIG. 17(b), an example of localization using an angle of departure (AoD) is shown. Specifically, a transmitter such as a beacon may include a plurality of antennas and may transmit a signal for location measurement. A receiver such as a mobile terminal may analyze a waveform of a signal transmitted from the transmitter to measure an angle at which the signal departs from the transmitter.

If a plurality of transmitters exist in the vicinity of the receiver, the receiver may determine the location of the receiver in space using angles from the plurality of transmitters derived by the AoA or AoD method.

Figure 18:
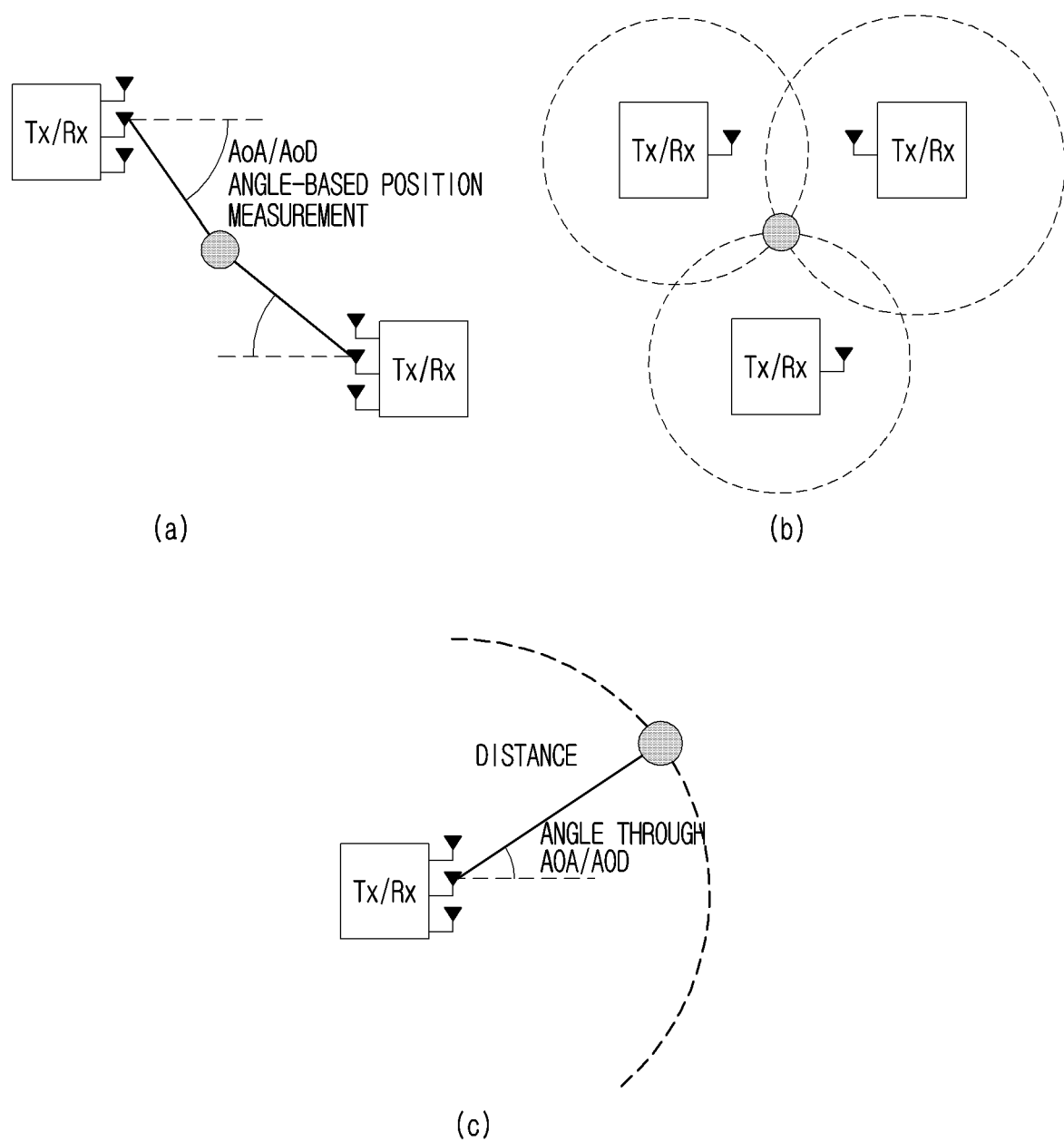
FIG. 18 is a diagram for describing a Bluetooth asset tracking method to which the present disclosure may be applied.

FIG. 18 is a diagram for describing a Bluetooth asset tracking method to which the present disclosure may be applied.

The Bluetooth asset tracking may include an angle-based location measurement, a signal strength-based location measurement, and a distance and angle-based location measurement method.

FIG. 18(a) shows an example of angle-based location measurement using AoA and/or AoD methods. For example, a location of a physical object may be determined using a plurality of arrival/departure angles.

FIG. 18 (b) shows an example of location measurement using a received signal strength indicator (RSSI). For example, the signal strength may indicate a distance, and the signal strength (i.e., distance) of a plurality of transmitters/receivers may be used to determine a location of a physical object.

FIG. 18(c) shows an example of location measurement using an angle and a distance. The location may be determined by combining the angle and distance measured by the AoA/AoD method.

Among these location measurement methods, AoA and AoD angle measurement may be applied to a connection-orient method between a transmitter and a receiver. That is, AoA/AoD angle measurement and localization based thereon may be applied on the premise of a connection between a transmitter transmitting a signal for location measurement and a receiver receiving the same. However, although AoD angle measurement is possible in a connectionless method, a connectionless method AoA angle measurement and a localization method based thereon are not yet prepared. That is, when a connection is not established between a transmitter that transmits a signal for location measurement and a receiver that receives the signal, AoD angle measurement is possible, but AoA angle measurement is not supported.

Figure 19:
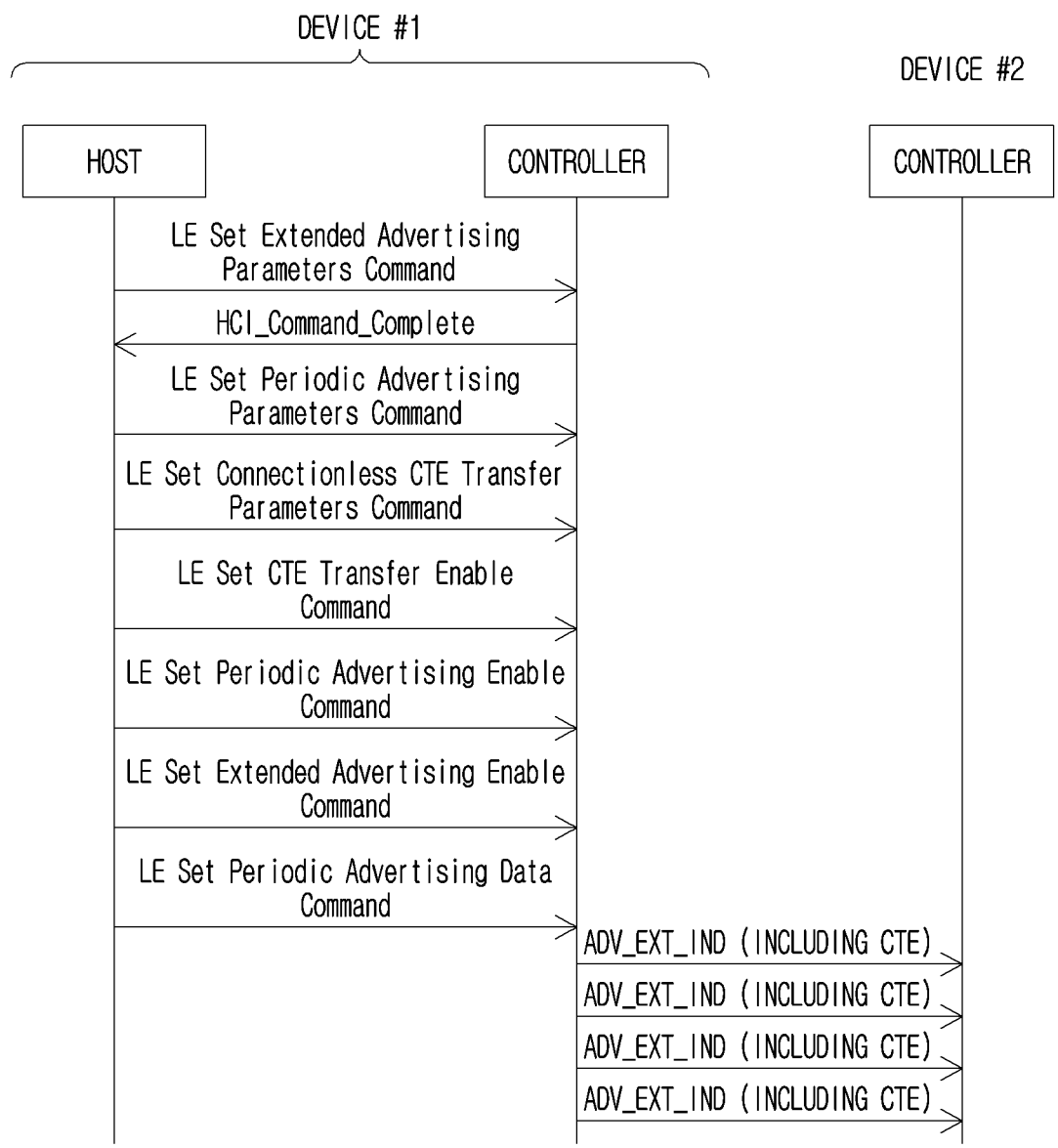
FIG. 19 is a diagram for describing an example of the operation of an advertiser among connectionless-based localization methods to which the present disclosure is applicable.

FIG. 19 is a diagram for describing an example of the operation of an advertiser in a connectionless-based localization method to which the present disclosure is applicable.

In FIG. 19, device #1 may correspond to an advertiser, and device #2 may correspond to a scanner. The host of the device #1 may transmit various commands to the controller, and in response, the controller may transmit an HCI command complete message. In the example of FIG. 19, the HCI command completion message in response to each command is omitted.

The host of device #1 may deliver, to the controller, commands including an extended advertising parameter, a periodic advertising parameter, and a non-connected constant tone extension (CTE) delivery parameter and commands for enable CTE Delivery, enable Periodic Advertising, enable extended advertising, periodic advertising data sequentially. Accordingly, device #1 may deliver a periodic advertising packet including the CTE field.

Device #2 may receive an advertising packet (e.g., ADV_EXT_IND) transmitted from device #1 and may perform localization using the CTE included therein. For example, device #2 may use CTE to extract I/Q data (i.e., in-phase and quadrature phase information required for location calculation) from a wireless signal, and perform localization or asset tracking based on this.

According to this CTE-based localization method, since device #1 frequently transmits an advertising packet, there is a problem in that battery consumption increases. In addition, in order for a certain device to use CTE, it is required to have a controller in which a corresponding feature (e.g., CTE optional feature in Bluetooth 5.1 version) is implemented. Since the CTE field is defined to be added as an additional field after the CRC field in the packet structure shown in FIG. 2(a), a device that does not support this function cannot transmit or receive a packet including the CTE field. That is, not all devices may transmit or receive the advertising packet including the CTE, but only devices supporting such a function may perform an operation as illustrated in the example of FIG. 19.

Figure 20:
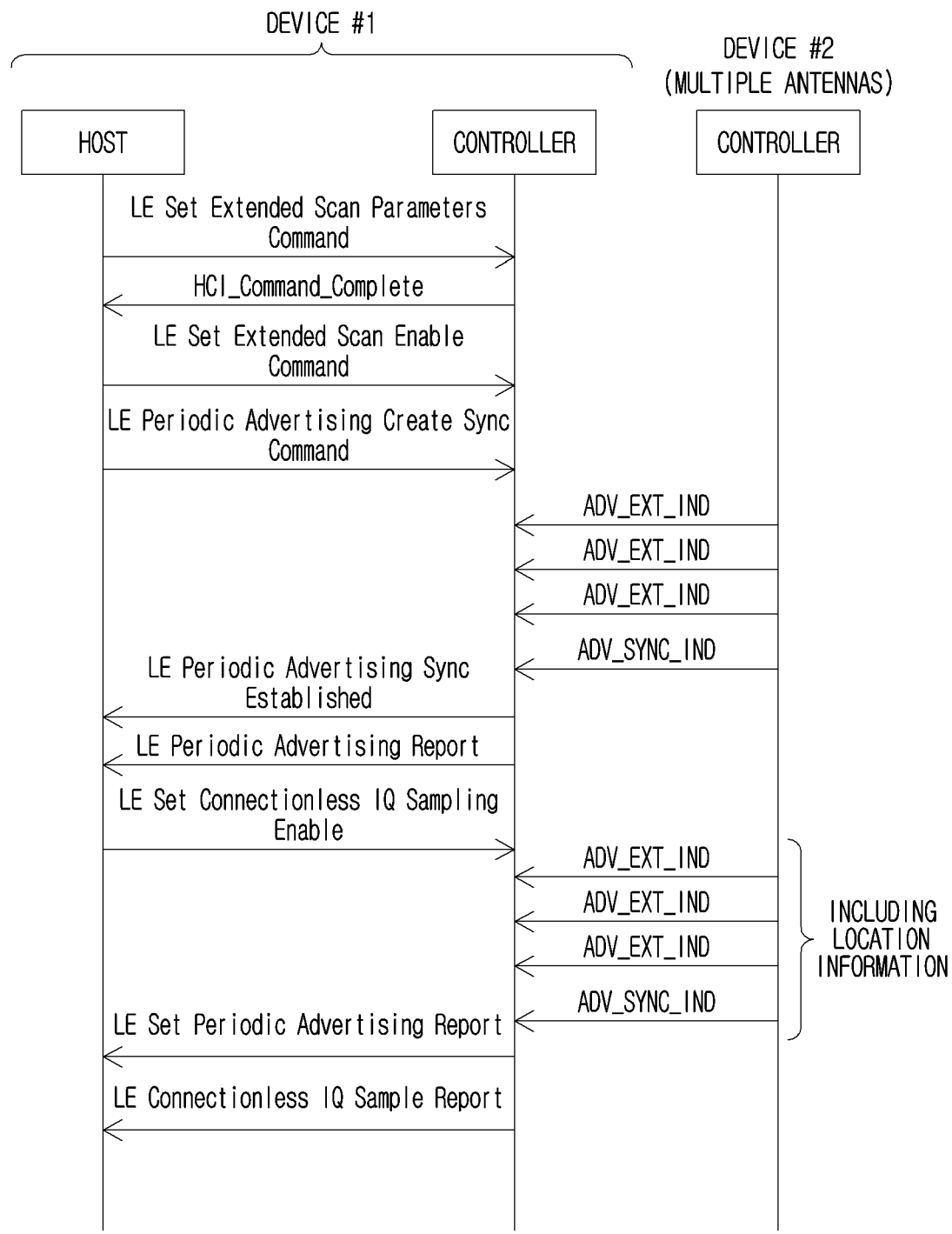
FIG. 20 is a diagram for describing an example of operation of a scanner among connectionless-based localization methods to which the present disclosure is applicable.

FIG. 20 is a diagram for describing an example of operation of a scanner among connectionless-based localization methods to which the present disclosure is applicable.

In FIG. 20, device #1 may correspond to a scanner, and device #2 may correspond to an advertiser. The host of the device #1 may transmit various commands to the controller, and in response, the controller may transmit an HCI command complete message. In the example of FIG. 20, an HCI command completion message in response to each command is omitted.

The host of device #1 may sequentially send extended scan parameters, extended scan activation, and periodic advertising generation synchronization commands to the controller. Accordingly, device #1 may receive an advertising packet (e.g., ADV_EXT_IND) delivered from device #2.

In addition, the controller of device #1 receiving ADV_SYNC_IND from device #2 may transmit a periodic advertising synchronization establishment message and periodic advertising report message to the host. The host of device #1 may instruct the controller to enable connectionless I/Q sampling. Device #1 may perform location determination or asset tracking by using location information (e.g., CTE) included in an advertising packet (e.g., ADV_EXT_IND) received from device #2.

Thereafter, the controller of device #1 receiving the ADV_SYNC_IND from device #2 may deliver a periodic advertising report message and a disconnection I/Q sample report message to the host.

In the example of FIG. 20, in order for the device #1 to perform AoD localization, the device #1 needs to know in advance information on the arrangement of multiple antennas of the device #2, the antenna switching method, and the like. Even if device #1 receives location information from device #2, if device #1 does not know antenna related information of device #2, localization cannot be performed.

Hereinafter, various examples of a new method for connectionless-based asset tracking or location determination will be described.

FIG. 21 is a diagram for describing an example of an advertising packet to which the present disclosure is applicable.

The present disclosure includes an example of defining a new type of advertising packet for asset tracking. For example, while using the advertising packet format, the advertising data type may be specified as a new value indicating data used for tracking, and information used for tracking (or localization) may be included in the advertising data.

FIG. 21(a) and FIG. 21(b) correspond to FIG. 2(a) and FIG. 2(b), and thus description thereof will be omitted. However, since FIG. 21 is for an advertising packet, the payload of FIG. 21(b) may be composed of an advertising channel PDU having a length of 6 to 37 octets.

In the case of the advertising packet, the payload of FIG. 21(b) may include an AdvA field with a length of 6 octets and an AdvData field with a length of 0 to 31 octets as shown in FIG. 21(c). The AdvA field may include a public address or a random address of the advertiser. The AdvData field may include zero or more advertising data (AD) structures and padding if necessary.

FIG. 21(d) shows the format of one AD structure. The AD structure may include three fields. The length field may indicate the length of the AD Data field. That is, a value obtained by subtracting 1 from the value indicated by the length field may correspond to the length of the AD Data field. The AD Type field may indicate the type of data included in the AD Data field. The AD Data field may include advertising data provided from the advertiser's host.

In order to indicate a new advertising packet used for asset tracking used in the present disclosure, AD Type may include a value indicating information used for tracking, and AD Data may include information used for tracking. For example, AD Type may have a value indicating "Tracking". Also, AD Data may include a pseudo-noise sequence tone.

In this way, to transmit the advertising packet including the PN (pseudo-noise) sequence in the advertising data, The advertising packet (specifically, the payload of the advertising channel PDU) may be designed by changing the AD Data of the PN sequence and the AD Type indicating it to be included.

In this way, by using the advertising data payload to deliver information used for asset tracking or localization, the asset tracking or localization method according to the present disclosure may also be applied to a device supporting the existing advertising packet format.

For example, AdvData may include one or more AD structures. When the advertising packet supports a connectionless asset tracking service, at least one of the one or more AD structures may include an AD structure related to a connectionless asset tracking service. One connectionless asset tracking service related AD structure may include a Length field, an AD Type field, and an AD Data field. For example, when the value of the length field is 4, one AD Type field (1 octet) and an AD Data field having a length of 3 octets may be included. The AD Type field may include a value corresponding to a unique number indicating tracking (or connectionless asset tracking service). The unique number is not limited to a specific value, and may have any value as long as the value is assigned to indicate tracking (or connectionless asset tracking service). The AD Data field may include PN data at the corresponding position for tone generation through the scrambler based on the position of the desired waveform (e.g., AD structure value).

The present disclosure is not limited to the above-described example, and other various types of information used for asset tracking (or localization) in addition to the PN sequence are included in the payload of the advertising packet. Hereinafter, information including an example of a PN sequence is collectively referred to as "tracking information".

For example, the device (device #2 in the example of FIG. 19, or device #1 in the example of FIG. 20) that receives the advertising packet including tracking information, tracks connectionless assets in an I/Q sampling method service may be performed. For example, before the host determines whether the AD Type of a specific AD structure in the corresponding advertising packet includes a value indicating a connectionless asset tracking service, the controller of the device receiving the advertising packet may sample and store the specific AD structure in a storage (e.g., a buffer). When the host determines that the specific AD structure includes a value indicating a connectionless asset tracking service, the host may provide a command instructing the controller to activate I/Q sampling. In addition, the I/Q sampling activation command may be provided together with sampling-related parameter information (e.g., information indicating which AD structure (or storage) to perform I/Q sampling on data corresponding to). Connectionless asset tracking (or AoA measurement) may be performed based on such I/Q sampling.

Figure 22:
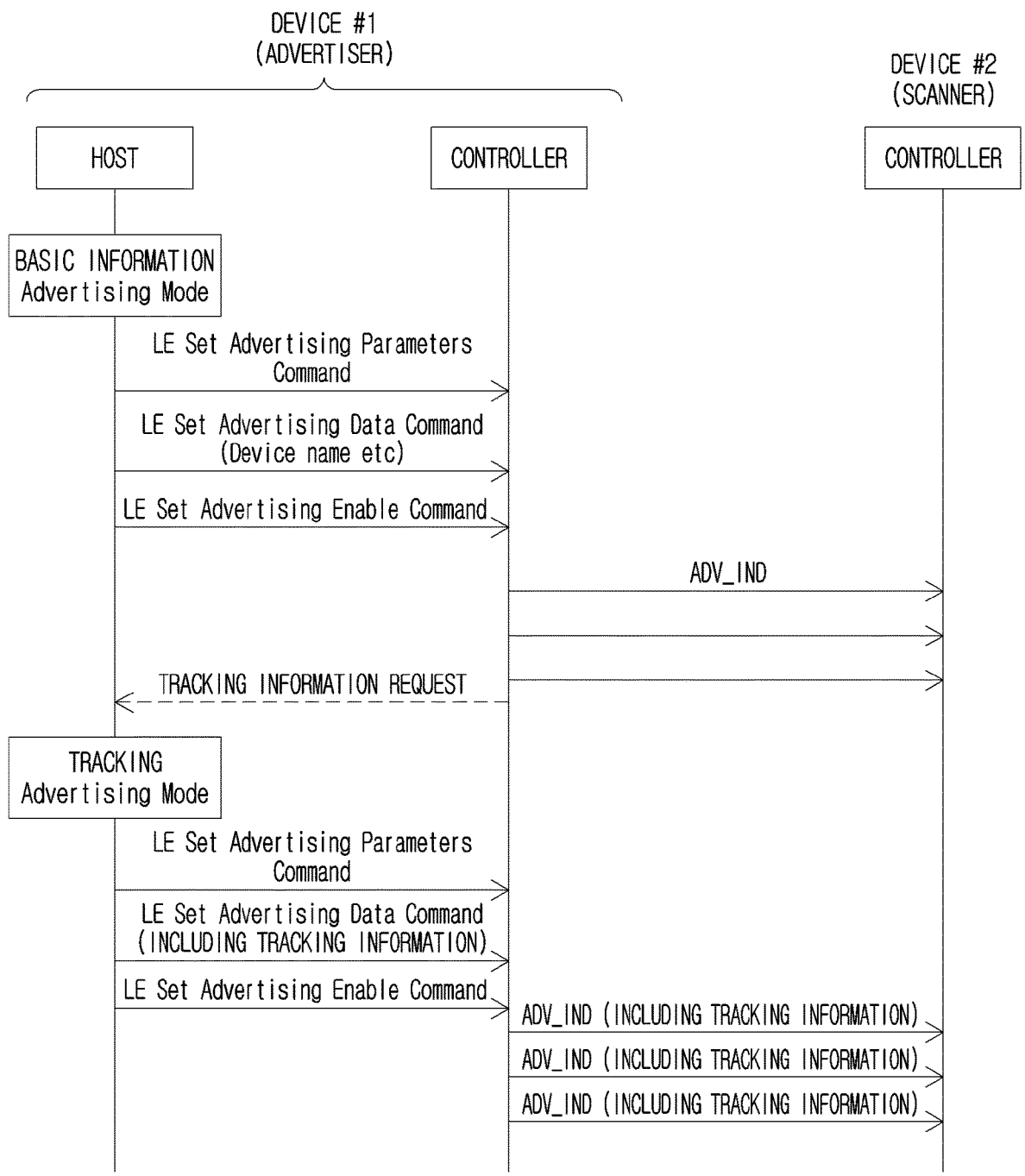
FIG. 22 is a diagram for describing an example of the operation of an advertiser in a connectionless AoA-based localization method to which the present disclosure is applicable.

FIG. 22 is a diagram for describing an example of an operation of an advertiser in a connectionless AoA-based localization method to which the present disclosure is applicable.

In the example of FIG. 22, the advertiser as device #1 may correspond to a connectionless AoA advertiser. Device #2 may correspond to a scanner.

In the present disclosure, the advertiser may perform an advertising operation by switching between the first mode and the second mode. The first mode is defined as a mode for performing general advertising, and may perform an operation of advertising basic information related to advertising. The second mode is defined as a mode for performing advertising for tracking, and may perform an operation of advertising tracking information necessary for tracking (or localization).

In the example of FIG. 22, when the host of the device #1 operates in the first mode (or basic info advertising mode), it may transmit an advertising parameter, advertising data, and an advertising activation command to the controller. The controller may transmit a message (e.g., HCI command completion) in response to each command from the host to the host, which is omitted in the example of FIG. 22.

Accordingly, the controller of the device #1 may transmit an advertising packet (e.g., ADV_IND) to the device #2, and the device #2 may perform a scanning operation using this.

When a predetermined condition is satisfied, the controller of the device #1 may perform a tracking info request operation from the host. Accordingly, the host of device #1 may operate in the second mode (or tracking advertising mode).

In this case, the host of the device #1 may transmit the advertising parameter, advertising data, and advertising activation command to the controller. The controller may transmit a message (e.g., HCI command completion) in response to each command from the host to the host, which is omitted in the example of FIG. 22.

Here, when the host of the device #1 transmits the advertising data to be included in the advertising packet to the controller, tracking information may be included in the advertising data. Accordingly, when the controller of the device #1 transmits the advertising packet (e.g., ADV_IND) to the device #2, tracking information may be included in the payload of the advertising packet. For example, the tracking information may correspond to a PN sequence, and the AD Type of the payload of the advertising packet may have a value indicating the tracking information.

Accordingly, device #2 may perform connectionless-based localization (e.g., connectionless AoA localization) using the tracking information received from device #1.

Figure 23:
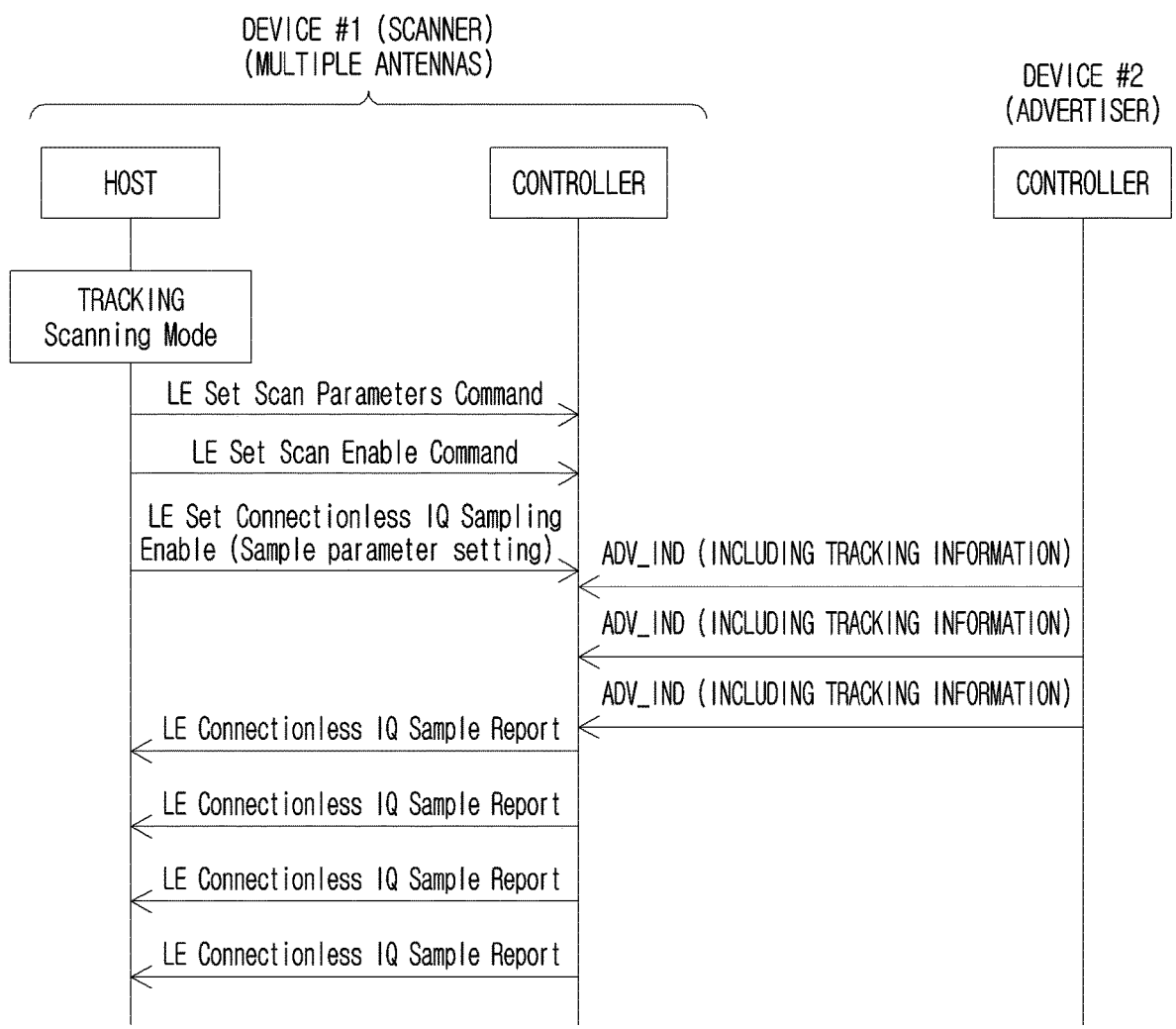
FIG. 23 is a diagram for describing an example of operation of a scanner in a connectionless AoA-based localization method to which the present disclosure is applicable.

FIG. 23 is a diagram for describing an example of operation of a scanner in a connectionless AoA-based localization method to which the present disclosure is applicable.

In the example of FIG. 23, the device #1 scanner may correspond to a connectionless AoA scanner having multiple antennas. Device #2 may correspond to an advertiser.

In the present disclosure, the scanner may perform a scanning operation by switching between the first mode and the second mode. The first mode is defined as a mode for performing general scanning, and a scanning operation using basic information from an advertiser may be performed. The second mode is defined as a mode for performing scanning for tracking, and may perform a scanning operation (or localization) using tracking information required for tracking (or localization) from an advertiser.

Although not shown in the example of FIG. 23, when the host of device #1 operates in the first mode (or basic information scanning mode), it may transmit scan parameters and scan activation commands to the controller. The controller may transmit a message (e.g., HCI command completion) in response to each command from the host to the host, which is omitted in the example of FIG. 23. Accordingly, the controller of the device #1 may perform a general scanning operation using the advertising packet (e.g., ADV_IND) received from the device #2.

When a predetermined condition is satisfied, the host of device #1 may operate in the second mode (or (or tracking scanning mode)).

In this case, the host of the device #1 may transmit a scan parameter and a scan activation command, and the controller of the device #1 may receive an advertising packet (e.g., ADV_IND) received from the device #2.

Here, the advertising packet received by the device #1 may include tracking information. For example, the tracking information may correspond to a PN sequence, and the AD Type of the payload of the advertising packet may have a value indicating the tracking information.

Accordingly, device #1 may perform connectionless-based localization (e.g., connectionless AoA localization) using the tracking information received from device #2.

For example, the host of device #1 may send a connectionless I/Q sampling enable command to the controller. These commands may include information on sampling parameter configuration. For example, the sampling parameter may include information such as a configuration for the average number of samples per scanning channel and a reporting interval for a sampling result. The controller may transmit a message (e.g., HCI command completion) in response to the command from the host to the host, which is omitted in the example of FIG. 23.

Accordingly, the controller of the device #1 may perform I/Q sampling using the tracking information included in the advertising packet received from the device #2. The sampling result may be transmitted from the controller to the host through a connectionless I/Q sample report message.

Since device #1, which is a scanner, has multiple antennas, unlike the AoD method, asset tracking (or localization) is possible even if device #1 does not know the antenna-related information of device #2, an advertiser, in advance.

For example, in the examples of FIGS. 22 and 23, the advertiser may be a connectionless asset tracking service server, and the scanner may be a connectionless asset tracking service client. The client may activate the connectionless asset tracking service by writing or reading characteristics instructing the server to enable the connectionless asset tracking service. In addition, information (e.g., interval, duration, timeout, etc.) about the time when the connectionless asset tracking service is performed may be written to or read from the server by the client. The step of activating the connectionless asset tracking service between the client and the server may be performed based on the connection between the client and the server, but after activating the connectionless asset tracking service, the connection between the client and the server may be released.

The connectionless asset tracking service client (or scanner) may perform scanning to detect the AD structure included in the advertising packet from the connectionless asset tracking service server (or advertiser). When the AD type field of the detected AD structure includes a value indicating the connectionless asset tracking service, connectionless asset tracking (or AoA measurement) may be performed based on tracking information (or PN data) included in AD Data of the corresponding AD structure.

When the connectionless asset tracking service is no longer needed, the client may deactivate the connectionless asset tracking service by writing a feature instructing the server to disable the connectionless asset tracking service.

Figure 24:
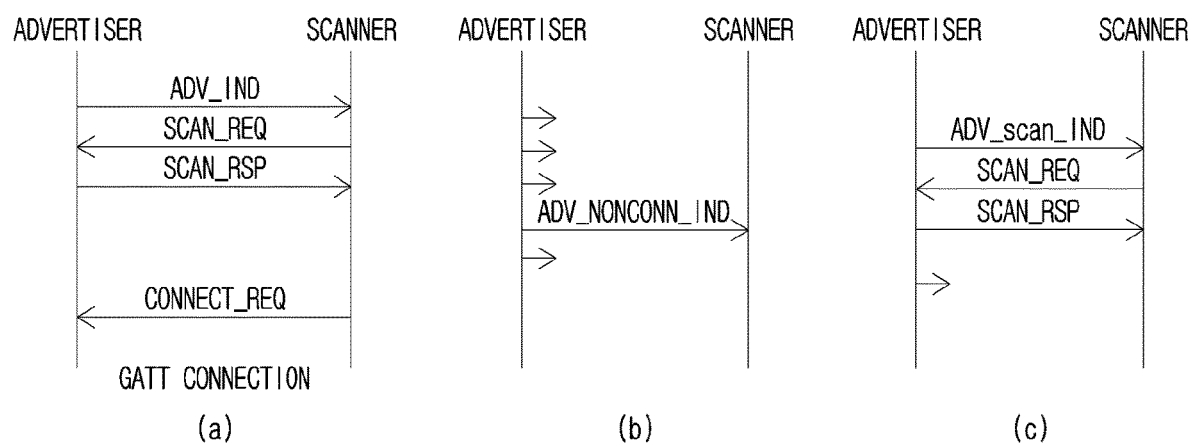
FIG. 24 is a diagram for describing various types of advertising operations to which the present disclosure is applicable.

FIG. 24 is a diagram for describing various types of advertising operations to which the present disclosure is applicable.

In the connectionless-based tracking method as described above, in order to grasp the location information in real time, it is required to transmit the tracking information through the advertising packet at intervals of less than 1 second. However, there is a problem in that it is difficult to always apply the frequent advertising operation as described above due to an increase in power consumption of the device. Therefore, as described above, the advertising mode is divided into a first mode and a second mode, basic advertising information transmission is performed in the first mode, and tracking information transmission is performed in the second mode, thereby minimizing an increase in device power consumption.

Also, the advertising interval in the first mode may be larger than the advertising interval in the second mode. For example, in the first mode, an advertising packet may be transmitted once every 5 seconds, and in the second mode, an advertising packet may be transmitted once every 100 ms. However, this advertising interval value is merely an example, and various interval values may be applied.

Here, a new protocol for switching between the first mode and the second mode is required. For example, the first device basically performs the advertising operation of the first mode, and when a request from the second device occurs, the first device may switch to the advertising operation of the second mode and transmit the tracking information.

The advertising operation shown in FIG. 24 may be divided into connectable undirected advertising as shown in FIG. 24 (*a*), non-connectable undirected advertising as shown in FIG. 24(*b*), and scannable undirected advertising as shown in FIG. 24(*c*). In the communication protocol between the advertiser and the scanner, the advertiser broadcasts advertising information without specifying the scanner. Therefore, it may be difficult for a scanner to define a new message requesting a specific action from an advertiser. In addition, in the communication protocol shown in FIG. 27, the scanner may transmit a scan request (SCAN_REQ) message to the advertiser. However, since the scan request does not include a data payload, it is difficult to add information explicitly requesting a specific operation of the advertiser.

Figure 25:
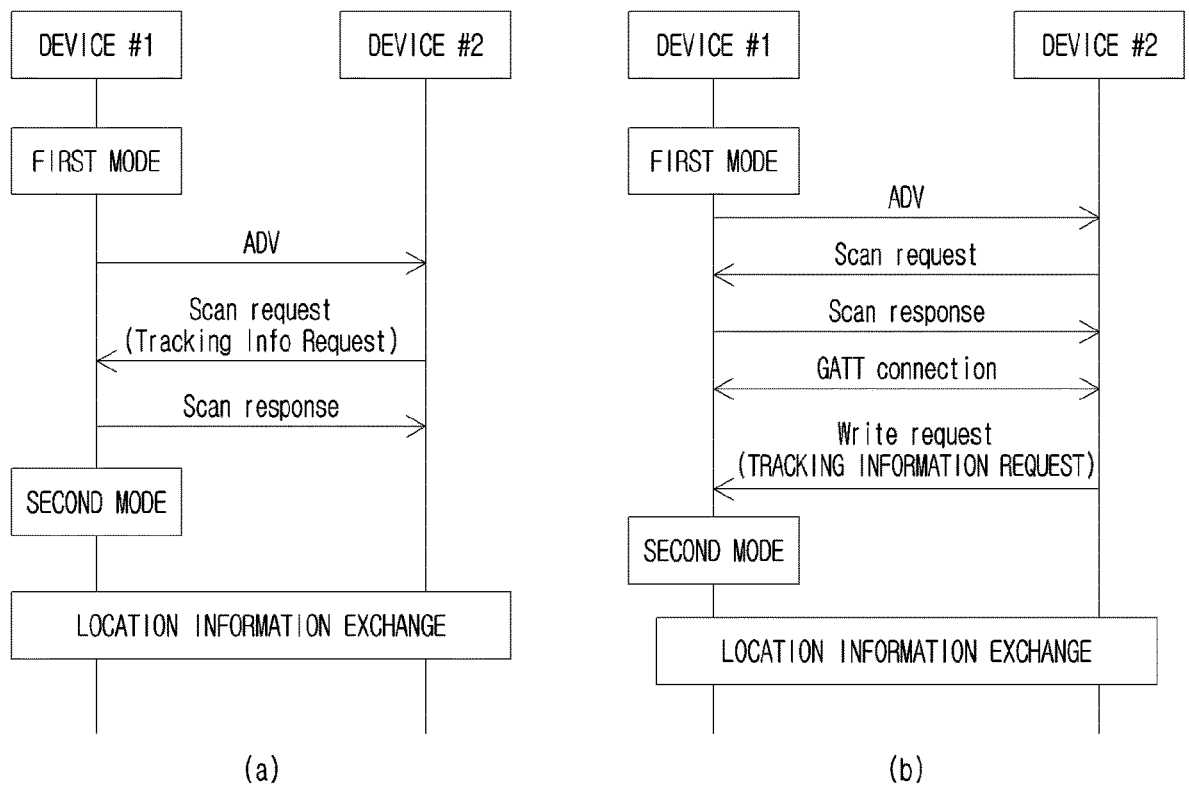
FIG. 25 is a diagram for describing a tracking information request operation to which the present disclosure is applicable.

FIG. 25 is a diagram for describing a tracking information request operation to which the present disclosure is applicable.

In response to the request for tracking information from device #2, which is the scanner of FIG. 22, it has been described that device #1, which is an advertiser, transmits tracking information to device #2 by switching from the basic information advertising mode (or the first mode) to the tracking advertising mode (or the second mode). Here, specific examples of the tracking information request will be described with reference to FIG. 25.

In the example of FIG. 25, device #1 may correspond to an advertiser or a peripheral device that provides tracking information, and device #2 may correspond to a scanner or tracker that obtains tracking information and performs localization.

In the example of FIG. 25(*a*), the device #1 operating in the first mode may switch from the first mode to the second mode upon receiving a scan request from the device #2. For example, when a scan request from device #2 is received, device #1 may process a request for tracking information from device #2 as being received. Alternatively, device #1 may process a scan request from device #2 as implicitly indicating a tracking information request. Alternatively, the device #1 may operate in the first mode before receiving the scan request from the device #2, and may operate in the second mode when the scan request from the device #2 is received. That is, instead of defining the tracking information request separately, the scan request may be reused as the tracking information request.

As an additional example, only when a predetermined condition is satisfied, when the scan request from the device #2 is received, the device #1 may process the tracking information request from the device #2 as being received.

For example, whether the predetermined condition is satisfied may be determined according to whether the device #1 performs a location-based service. Specifically, when a scan request from device #2 is received when device #1 is performing a location-based service, device #1 may process a tracking information request as received. Alternatively, when the scan request from the device #2 is received when the device #1 is not in the location-based service, the device #1 may process that the request for tracking information is not received. Alternatively, the device #1 in the location-based service may operate in the first mode before receiving the scan request from the device #2, and may operate in the second mode when the scan request from the device #2 is received. Alternatively, the device #1 that is not in the location-based service may operate in the first mode before the scan request from the device #2 is received, and may maintain the first mode even after the scan request from the device #2 is received. That is, whether to process the scan request as a tracking information request may be determined according to whether the location-based service operates.

For example, whether the predetermined condition is satisfied may be determined according to whether the type of device #1 corresponds to the predetermined type. Specifically, device #1 may be configured as a representative device of a device group capable of providing tracking information. That is, when the device #1 corresponding to the representative device receives the scan request from the device #2, the device #1 may process the tracking information request as received. Alternatively, when the scan request from the device #2 is received when the device #1 is not the representative device, the device #1 may process that the request for tracking information is not received. Alternatively, the device #1, which is the representative device, may operate in the first mode before receiving the scan request from the device #2, and may operate in the second mode when the scan request from the device #2 is received. Alternatively, the device #1 other than the representative device may operate in the first mode before the scan request from the device #2 is received, and may maintain the first mode even after the scan request from the device #2 is received. That is, whether the scan request is processed as a tracking information request may be determined according to whether the device is a representative device. Here, when device #1, which is the representative device, receives a scan request from device #2, it may transmit that the request for tracking information has occurred to member device(s) belonging to the device group. The member device(s) receiving the request for tracking information from the representative device may switch from the first mode to the second mode.

As an additional example, when peripheral devices including device #1 constitute a mesh network, device #2 may generate a tracking information request message based on the mesh packet and deliver it to devices belonging to the mesh network.

For example, a packet of a specific format including an AD Type field having a specific value corresponding to a connectionless asset tracking service and PN data for connectionless asset tracking may be defined. The packet of the specific format may be an advertising packet or a packet with a different name. The packet of the specific format may be a broadcast packet. The packet in the specific format may be received by devices belonging to the mesh network or may be transmitted by a device belonging to the mesh network to other devices.

As described above, when device #1 receives a request for tracking information from device #2, a response message may be transmitted to device #2. For example, device #1 may transmit a scan response message in response to receiving a scan request from device #2.

In the example of FIG. 25(b), device #1 operating in the first mode may establish a GATT connection with device #2 after exchanging a scan request, scan response, and connection request with device #2. Accordingly, device #2 may transmit the tracking information request to device #1 in a GATT write request method. Accordingly, the device #1 may switch from the first mode to the second mode.

When the device #1 is switched from the first mode to the second mode according to a request from the device #2, the device #1 may maintain the second mode for a predetermined time. After maintaining the second mode for the predetermined time, the device #1 may switch back to the first mode. Here, the predetermined time may be preset. For example, the predetermined time may be predefined as a default value for each device. Alternatively, the predetermined time may be determined through signaling between devices. Alternatively, the predetermined time may be basically applied according to a default value, and the predetermined time may be configured by signaling between devices.

Alternatively, the device #1 switching from the second mode to the first mode may be performed based on a message from the device #2. For example, when device #2 determines that it is no longer necessary to provide tracking information from device #1, a message indicating this may be transmitted to the device #1, and accordingly, the device #1 may switch from the second mode to the first mode.

Figure 26:
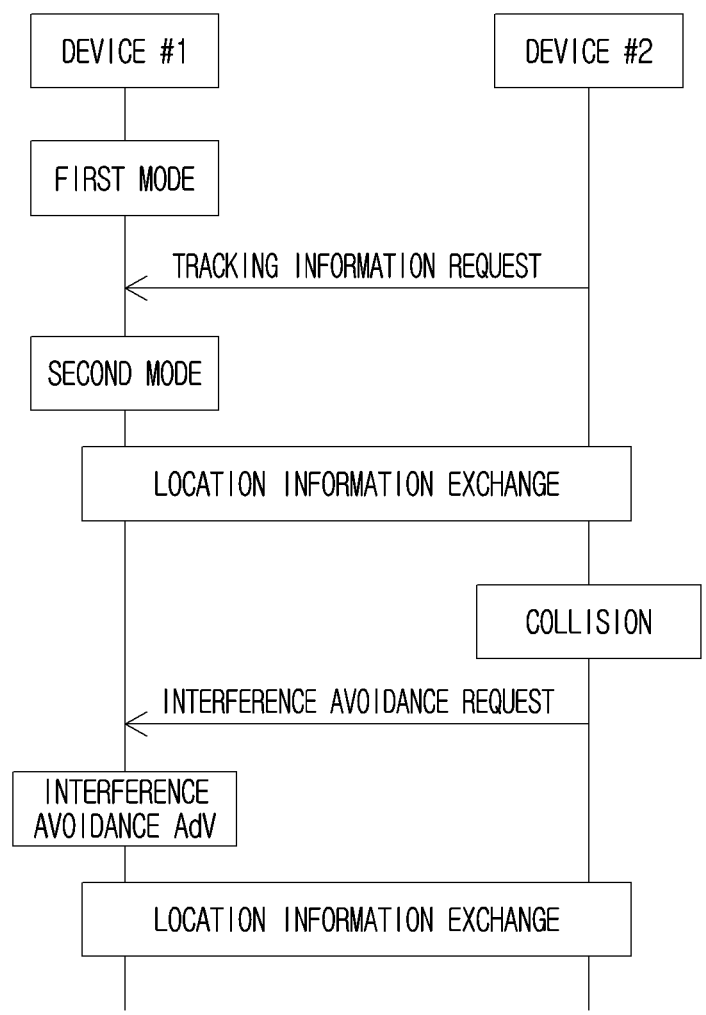
FIG. 26 is a diagram for describing an interference avoiding method to which the present disclosure is applicable.

FIG. 26 is a diagram for describing an interference avoiding method to which the present disclosure is applicable.

In the example of FIG. 26, device #1 may correspond to an advertiser or a peripheral device that provides tracking information, and device #2 may correspond to a scanner or tracker that obtains tracking information and performs localization.

When the device #1 operating in the first mode receives the tracking information request message of the various methods described above from the device #2, it may switch to the second mode and exchange location information. The location information exchange may include sending tracking information from device #1 to device #2.

Device #1 may transmit an advertising packet including tracking information in an advertising channel (e.g., channel indexes 37, 38, 39) in the second mode. In this case, when the device #2 receives the advertising packet, a collision situation in which the advertising packet cannot be correctly received or the localization is not performed correctly may occur depending on the degree of ambient interference.

Since the device #1 cannot recognize the collision situation of the device #2, the device #2 may transmit a message requesting interference avoidance to the device #1.

Device #1 receiving the interference avoidance request from device #2 may perform an interference avoidance advertising operation. The interference avoidance advertising operation may include switching a channel for transmitting the advertising packet to a data channel.

Accordingly, device #1 may transmit an advertising packet including tracking information on the changed channel. Specifically, in the example of FIG. 25, a scan request, a mesh packet, a GATT message, etc. may be applied as a tracking information request for device #1 operating in the first mode (i.e., not performing transmission of tracking information) and in the example of FIG. 26, a scan request, a mesh packet, a GATT message, etc. may be applied as an interference avoidance request for the device #1 operating in the second mode (i.e., performing tracking information transmission). That is, even if it is the same message, a request for the device #1 may be determined differently depending on the operation mode of the device #1.

Figure 27:
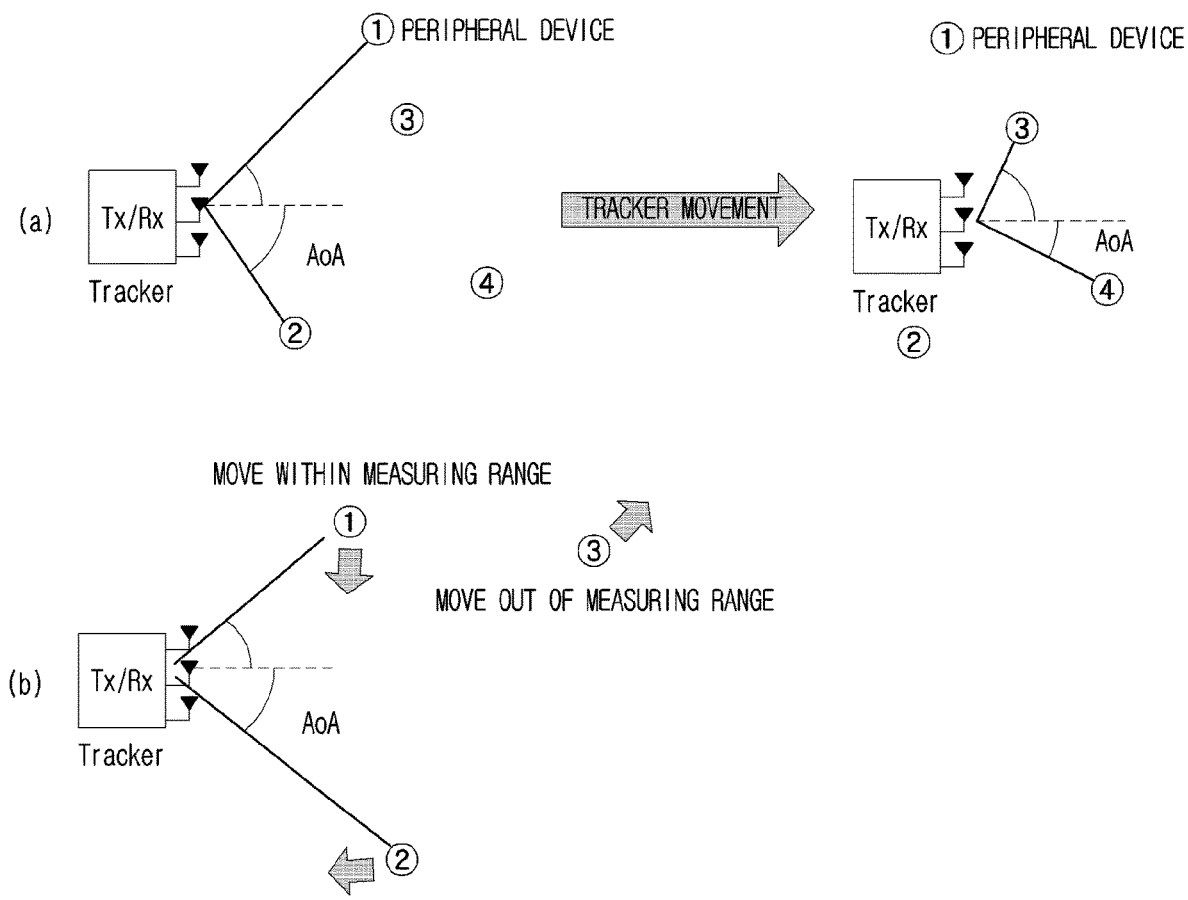
FIG. 27 is a diagram for describing an application example of connectionless AoA-based asset tracking to which the present disclosure is applicable.

FIG. 27 is a diagram for describing an application example of connectionless AoA-based asset tracking to which the present disclosure is applicable.

The example of FIG. 27(a) shows that the relative location (or AoA) of the tracker and the peripheral device dynamically changes when the device measuring the location of the peripheral device (i.e., the tracker) moves. The example of FIG. 27(b) shows that when the peripheral device moves, the relative location (or AoA) of the tracker and the peripheral device dynamically changes.

If location information is acquired based on the connection, the operation of establishing and disconnecting the connection between the tracker and the peripheral device occurs repeatedly in a situation in which the relative location of the tracker and the peripheral device dynamically change.

In this case, since the time required for connection increases, it is difficult to dynamically perform localization, and there is a problem in that the complexity of connection management between the tracker and a plurality of peripheral devices increases.

In addition, in the case of connectionless AoD-based asset tracking, since the peripheral device has multiple antennas, the tracker needs to know the antenna-related information of the peripheral device (i.e., antenna array, antenna switching method, etc.) in advance, so there is a problem of increasing time consumption and signaling complexity.

When connectionless AoA-based asset tracking is applied as in the examples of this disclosure, trackers with multiple antennas may locate peripherals more dynamically (e.g., in real time) without knowing the information about them in advance.

Figure 28:
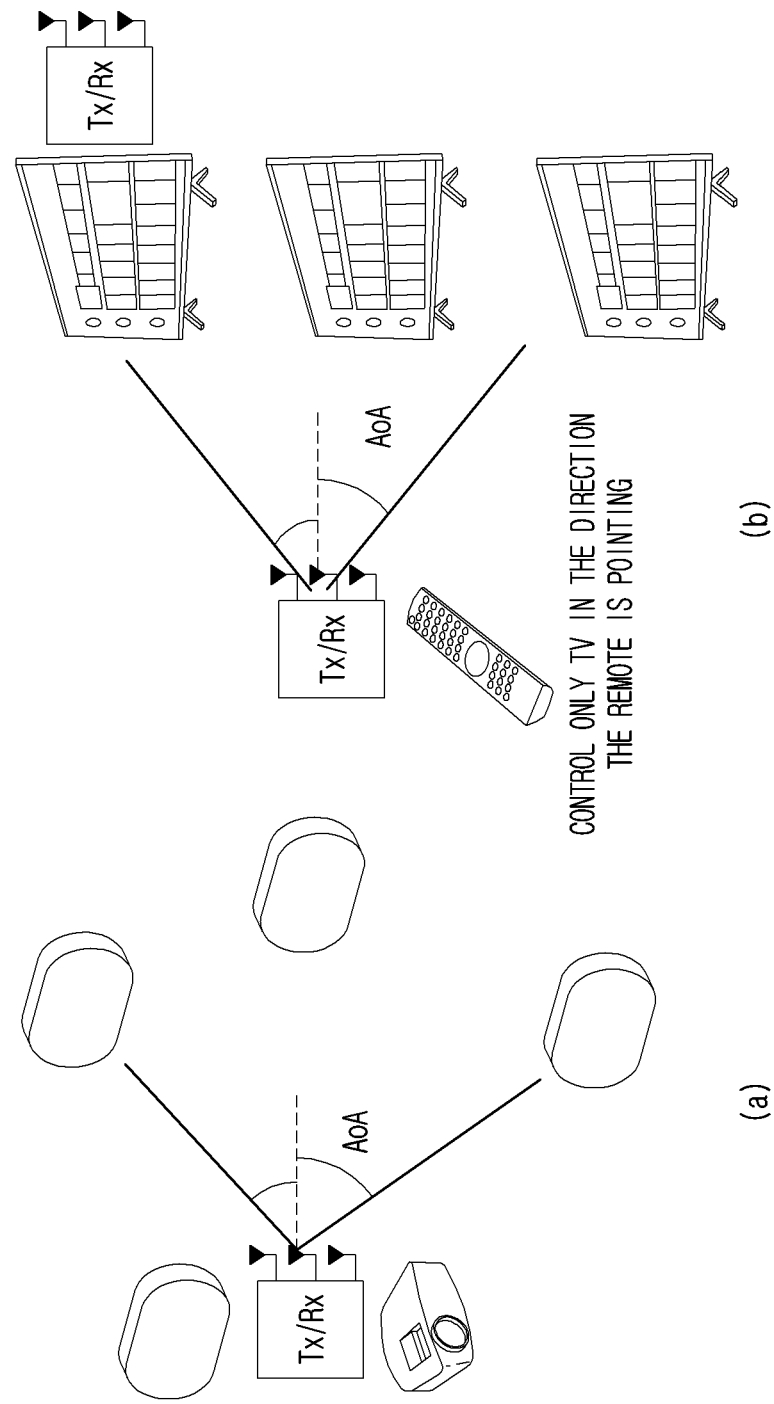
FIG. 28 is a diagram for describing an additional application example of connectionless AoA-based asset tracking to which the present disclosure is applicable.

FIG. 28 is a diagram for describing an additional application example of connectionless AoA-based asset tracking to which the present disclosure is applicable.

The example of FIG. 28(a) shows a case of configuring a multi-channel speaker centering on a mobile TV or a mobile projector. For example, a user may install or move a TV/projector or speakers to an arbitrary location. In this case, if connectionless AoA-based asset tracking according to the present disclosure is applied, the tracker may determine the location of the speakers in real time, and accordingly, a channel (e.g., Left, Right, Rear, etc.) mapped to each speaker may be dynamically configured.

The example of FIG. 28(b) shows a case of performing communication with a specific TV in a situation where several TVs are installed. In this case, if connectionless AoA-based asset tracking according to the present disclosure is applied, the tracker may dynamically determine the location of each TV. Accordingly, only the TV in the direction indicated by the remote control may be controlled.

The aforementioned connectionless AoA-based asset tracking may be applied to a wireless power transmission system. For example, location information of a device in a wireless power transmission system may be used to determine the amount of power to be transmitted. By applying the connectionless AoA-based asset tracking method described in examples of the present disclosure, location information of a wireless power transmitting/receiving device may be quickly and accurately determined.

Figure 29:
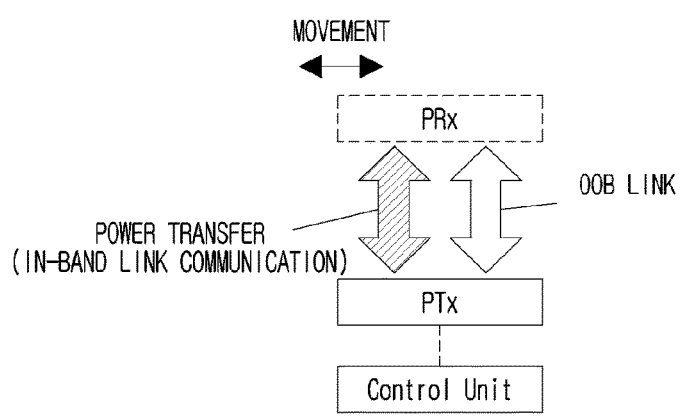
FIG. 29 is a diagram illustrating an example of a wireless power transmission system to which the present disclosure is applicable.
Figure 29:
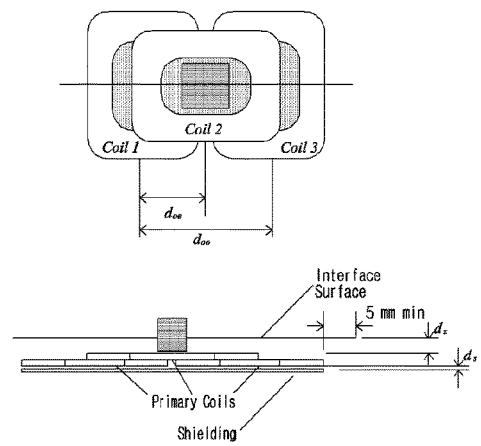
Figure 29:

FIG. 29 is a diagram illustrating an example of a wireless power transmission system to which the present disclosure is applicable.

In a wireless power transmission system, a relative location of a power receiving device (PRU or PRx) with respect to a power transmitting device (PTU or PTx) may be changed. For example, a case in which the PRx moves away from the PTx or the PRx moves from the PTx may occur. For example, a sudden movement in which the relative location of the PRx with respect to the PTx is changed for a short time (e.g., the movement shown in FIG. 29(a)) may occur. Here, even if the magnitude of the displacement is small, it may be necessary to change the transmission power.

When the relative location of the PRx with respect to the PTx is changed, power negotiation may be performed based on the relative location of the PRx and/or the degree of power reception through the communication link (e.g. in-band link or OOB link). The power negotiation procedure may be controlled by a control unit and may be performed over an in-band and/or OOB communication link. For example, when it is determined that the relative location of the PRx with respect to the PTx is changed (e.g., the distance from the PTx to the PRx is increased) and/or when it is determined that the power reception efficiency or degree of the PRx is lowered, PTx may increase the transmit power value.

If the PRx moves away from the PTx for a short time and approaches the PTx again (e.g., if the user misses the PRx while lifting it, or if there is a sudden change in the location of the PRx with respect to the PTx due to vibration in the vehicle, etc.), the PTx detects that the PRx has moved away and increases the transmission power. If the PRx approaches the PTx again within a short time after increasing the transmission power and the PRx fails to lower the transmission power, the PRx may be affected by a magnetic field corresponding to the increased power, and a problem may occur in the device or system.

The movement of the PRx (i.e., the change in the location of the PRx relative to the PTx) may be detected through a change in a magnetic field, a change in impedance, or the like. Movement of the PRx may be detected in one or more of PTx or PRx. Further, movement of the PRx may be detected over one or more of an in-band link or an OOB link.

For example, the movement or location change of the PRx may be detected through an OOB module provided in at least one of the PTx and the PRx.

If the BLE communication method is applied to the OOB link, the BLE module may be located on the primary coil of the PTx, and the movement of the PRx may be detected using the antenna of the BLE module. However, when the movement of the PRx is detected using a single antenna provided in the Bluetooth module, there is a problem in that the accuracy of the detected location is not sufficient. Specifically, although a sufficient location accuracy is provided at a proximity distance of a predetermined distance (e.g., 10 cm) or less, the structure of the PTx may be limited in order to use it. For example, in order to accurately detect the location of the PRx in the second coil (Coil 2) of FIG. 29(b), the BLE module must be installed in the center of the coil 2 or at a chargeable location.

Figure 30:
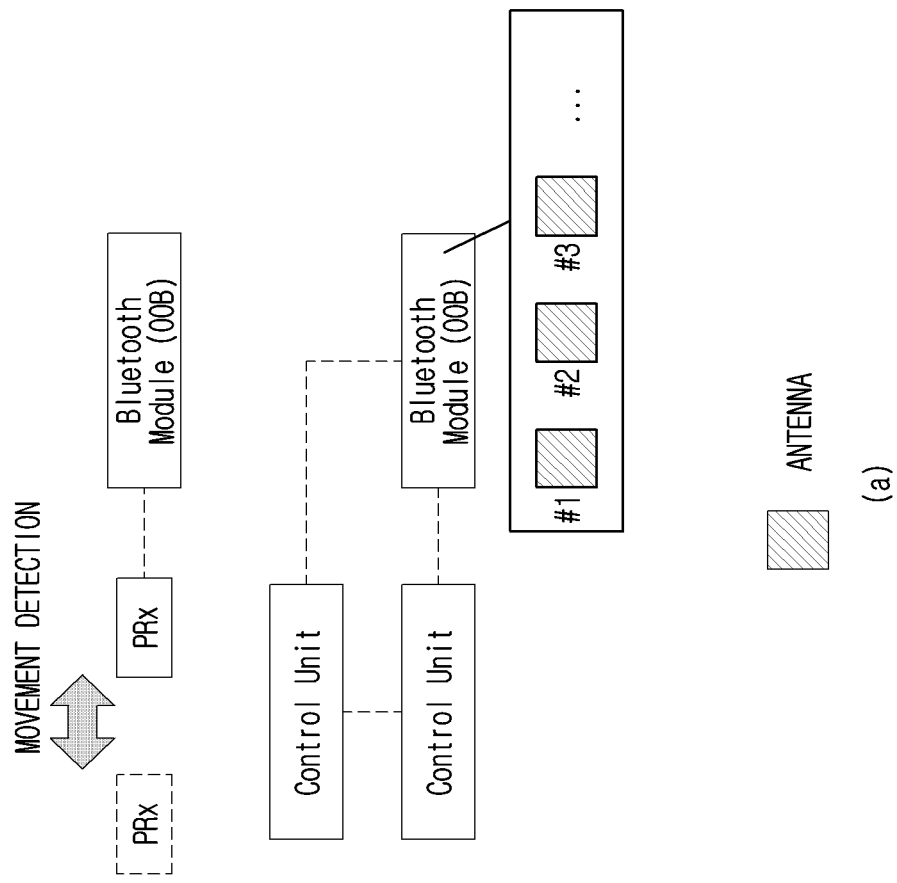
FIG. 30 is a diagram illustrating an example of using a plurality of antennas in a wireless power transmission system to which the present disclosure is applicable.

FIG. 30 is a diagram illustrating an example of using a plurality of antennas in a wireless power transmission system to which the present disclosure is applicable.

According to the present disclosure, at least one of PTx or PRx may include a plurality of antennas. For example, at least one of PTx or PRx may have three or more antennas for localizing the device itself. At least one of a PTx or a PRx with a plurality (e.g. 3 or more) of antennas may measure or detect a relative location change or movement of the PRx with respect to the PTx using two of the plurality (e.g., 3 or more) antennas. At least one of the PTx and the PRx may change (or request/indicate a change) the transmission power of the PTx based on information indicating that movement is detected.

FIG. 30(a) exemplarily illustrates the movement of the PRx (e.g., a change of a distance of 1 cm from the PTx). The PRx may have an OOB communication module. The PTx may have an OOB communication module. For example, the OOB communication module may be a BLE module.

The OOB module of PTx may include a plurality of antennas. The movement of the PRx may be detected using a plurality of antennas provided on the PTx side. In addition, the location of the PRx may be more accurately measured using a plurality of antennas on the PTx side. For example, an accurate location may be determined by a method such as triangulation using three antennas.

In addition, by providing a plurality of antennas, the location of the PRx may be accurately measured at any point on the PTx. For example, the OOB module having a plurality of antennas does not necessarily need to be located at the center of a specific coil of the PTx or at a chargeable point, and even if it is located at any point on the PTx, the location of the PRx may be accurately measured. That is, it is possible to detect the movement of the PRx or measure the location of the PRx without designing the circuit to place the OOB module at a specific location of the PTx.

Additionally, the movement (or change of location) of the PRx may be detected using a plurality of antennas of the PTx. For example, a quick movement of the PRx may be detected using a plurality of antennas of the PTx.

In detecting the movement of the PRx, two antennas may be used instead of three antennas. For example, even if three or more antennas are provided on the PTx side, two antennas among them may be selected and used to detect the movement of the PRx. In detecting the movement of the PRx, since only two resources (i.e., antennas) can provide sufficient performance, the use of three or more antennas results in inefficient use of resources.

In addition, in detecting the movement of the PRx, compared to processing information collected by three or more antennas, when processing information collected by two antennas, processing speed can be increased by reducing processing complexity, so that power control that responds more quickly to the sudden movement of the PRx (i.e., change of location for a short period of time) is possible.

Furthermore, the detection of movement of the PRx according to the present disclosure may include, but does not require, measuring an accurate location, and includes quickly detecting that a change in the location of the PRx has occurred. For this purpose, compared to the localization method using three or more antennas, the movement sensing method using only two antennas may further increase the efficiency of power transmission.

When three or more antennas are used in detecting the movement (or change of location) of the PRx, the detection may be more inaccurate compared to using two antennas. For example, when three antennas are used, inaccuracy in measuring the relative angle of the PRx with respect to the PTx may increase. For example, with the OOB module of PRx very close to the OOB module of PTx (e.g., when the second antenna (Antenna #2) is very close to 1 cm or less), even if the location of the PRx is slightly changed, the angle values measured by the first, second, and third antennas (Antenna #1, #2, and #3) may be greatly changed.

In addition, a detect mode for detecting movement (or location change) of a PRx using a plurality of antennas in a PTx having a plurality of antennas and a basic mode that does not detect or specify the movement or location of the PRx using a plurality of antennas may be defined separately.

Here, the basic mode and the detect mode may respectively correspond to the first mode and the second mode in the connectionless-based asset tracking method described above.

In the basic mode, a PTx having a plurality of antennas may perform communication using some or all of the plurality of antennas. For example, communication over an OOB link may be performed using one of a plurality of antennas. Alternatively, communication on an OOB link or localization of the device itself may be performed using three or more antennas among a plurality of antennas.

In the detect mode, PTx may improve the accuracy of movement (or change of location) detection by using two antennas among three or more antennas.

Two antennas used in the detect mode may be randomly selected in PTx having three or more antennas, two antennas farthest from the previously detected PRx location may be selected, or two antennas having the farthest distance between antennas may be selected.

Figure 31:
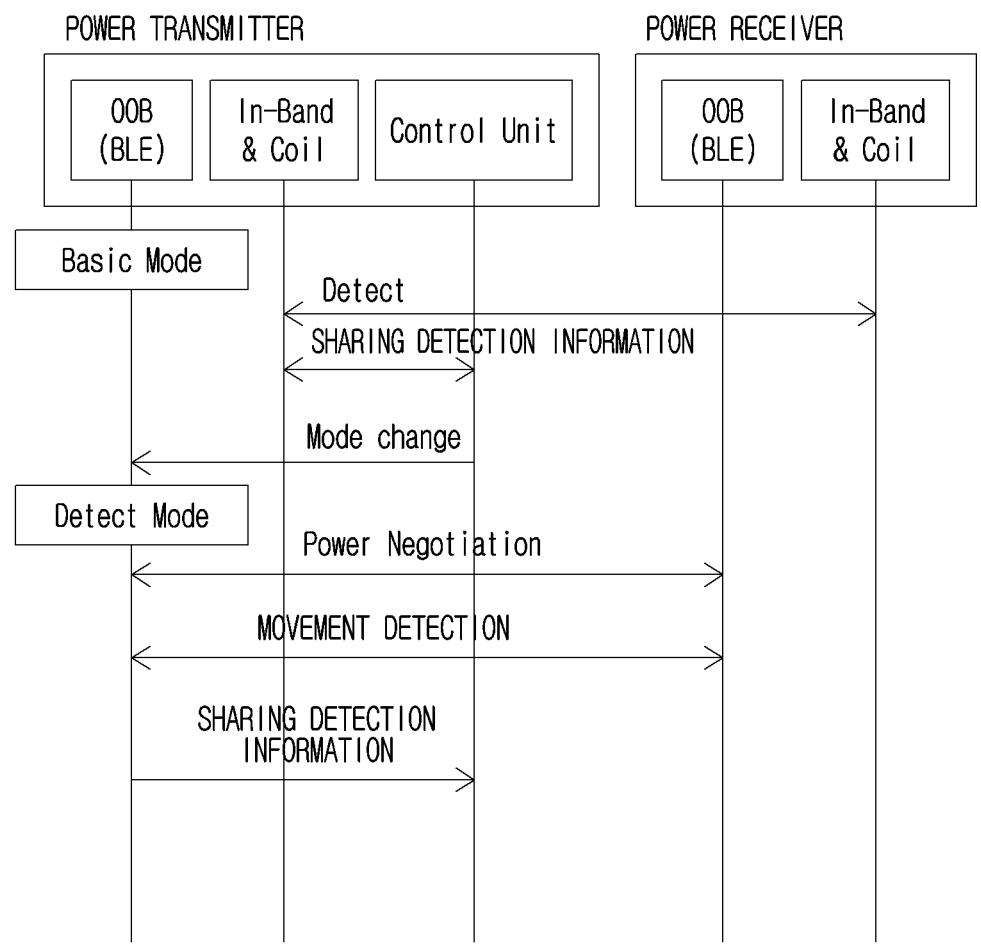
FIG. 31 is a diagram illustrating an example of a location information-based wireless power transmission method to which the present disclosure is applicable.

FIG. 31 is a diagram illustrating an example of a location information-based wireless power transmission method to which the present disclosure is applicable.

In FIG. 31, the power transmitter (i.e., PTx) may include an OOB module (e.g., BLE module), an in-band module and a primary coil, and a control unit. The power receiver (i.e., PRx) may include an OOB module (e.g., BLE module), an in-band module, and a secondary coil.

Until the PTx detects the presence of the PRx, the OOB module of the PTx may operate in the basic mode (or the first mode).

Upon detecting the proximity of the PRx in the in-band module and/or coil of the PTx, the detection information may be shared with the control unit. Accordingly, the control unit may transmit a message requesting or instructing the OOB module to change the mode.

Based on the message from the control unit, the OOB module may change the mode from the basic mode (or the first mode) to the detect mode (or the second mode).

In the detect mode (or the second mode), by selecting and driving two antennas among a plurality of antennas (e.g., 3 or more antennas) included in the PTx, movement (or relative location change) of the PRx with respect to the PTx may be detected. When movement (or relative location change) is detected, the OOB module of the PTx may share detection information on whether movement (or relative location change) has occurred and/or the degree of movement with the control unit.

Before or during the movement (or relative location change) detection operation, the OOB module of the PTx may exchange a message for a power negotiation procedure with the OOB module of the PRx.

In addition, multiple antennas may include both PTx or PRx or only one device. Also, it is not required that a particular device be multiple antennas.

Figure 32:
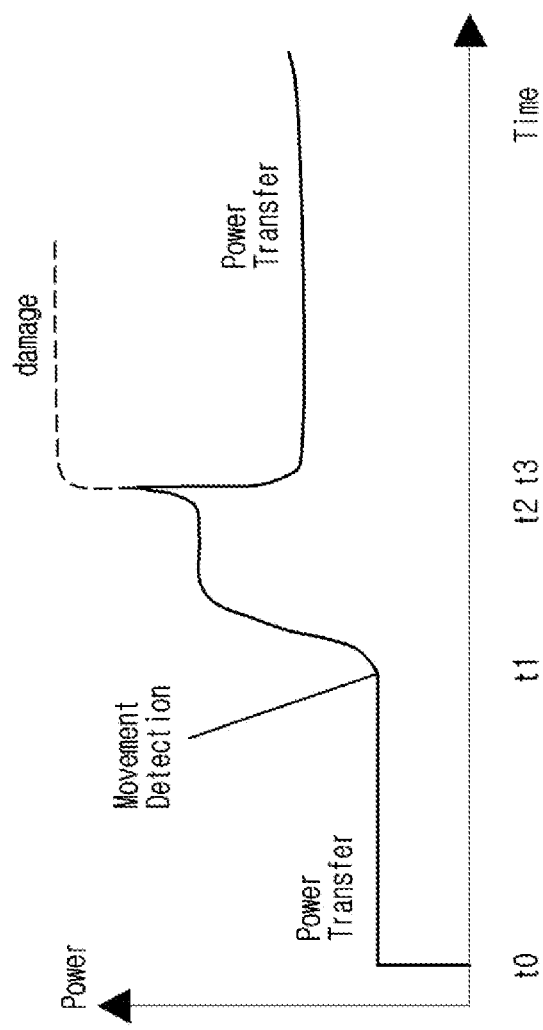
FIG. 32 is a diagram illustrating an example of a process of changing a transmit power size based on location information to which the present disclosure is applicable.

FIG. 32 is a diagram illustrating an example of a process of changing a transmit power size based on location information to which the present disclosure is applicable.

In the example of FIG. 32, when the PTx detects the presence of the PRx at the time t0, the identification information (ID) of the PRx may be checked and a configuration procedure for wireless power transmission may be performed. Accordingly, the OOB module of the PTx is switched to the detection mode, and the PTx may initiate power transmission to the PRx. As long as the movement of the PRx is not detected at the first location (e.g., until time t1), a constant amount of power may be transmitted.

When the movement of the PRx is detected at time t1 (or the relative location of the PRx with respect to the PTx is changed), for example, when the PRx moves away from the PTx and moves from the first location to the second location, the PTx may increase the amount of transmit power.

When it is detected that the PRx moves further away from the PTx and moves to the third location at the second location of the PRx at time t2, the PTx may additionally increase the amount of transmission power.

When the PRx moves from the third location to the fourth location within a short time (a location closer to the PTx than the third location) at time t3, the PTx may detect this immediately and reduce the transmission power. If the PTx does not accurately detect the movement of the PRx to the fourth location or the detection is delayed, in fact, an excessive amount of power is transmitted to a PRx that is close to the PTx again, which may cause a problem such as damage to the PRx and/or the PTx.

In the above examples, it has been described that a plurality of antennas are provided on the PTx side, but the scope of the present disclosure is not limited thereto. A plurality of antennas may be provided on the PRx side to detect a relative location change or movement of the PRx with respect to the PTx. In this case, the description of the movement (or relative location change) detection operation using the plurality of antennas on the PTx side described above may be replaced with the movement (or relative location change) detection operation using the plurality of antennas on the PRx side. In addition, a plurality of antennas may be provided in both PTx and PRx, respectively, in this case, a relative location change or movement of the PRx with respect to the PTx may be detected by using a plurality of antennas in any one of the PTx and PRx devices. That is, a plurality of antennas may be required in either PRx or PTx, and a specific device is not necessarily limited to having a plurality of antennas.

Figure 33:
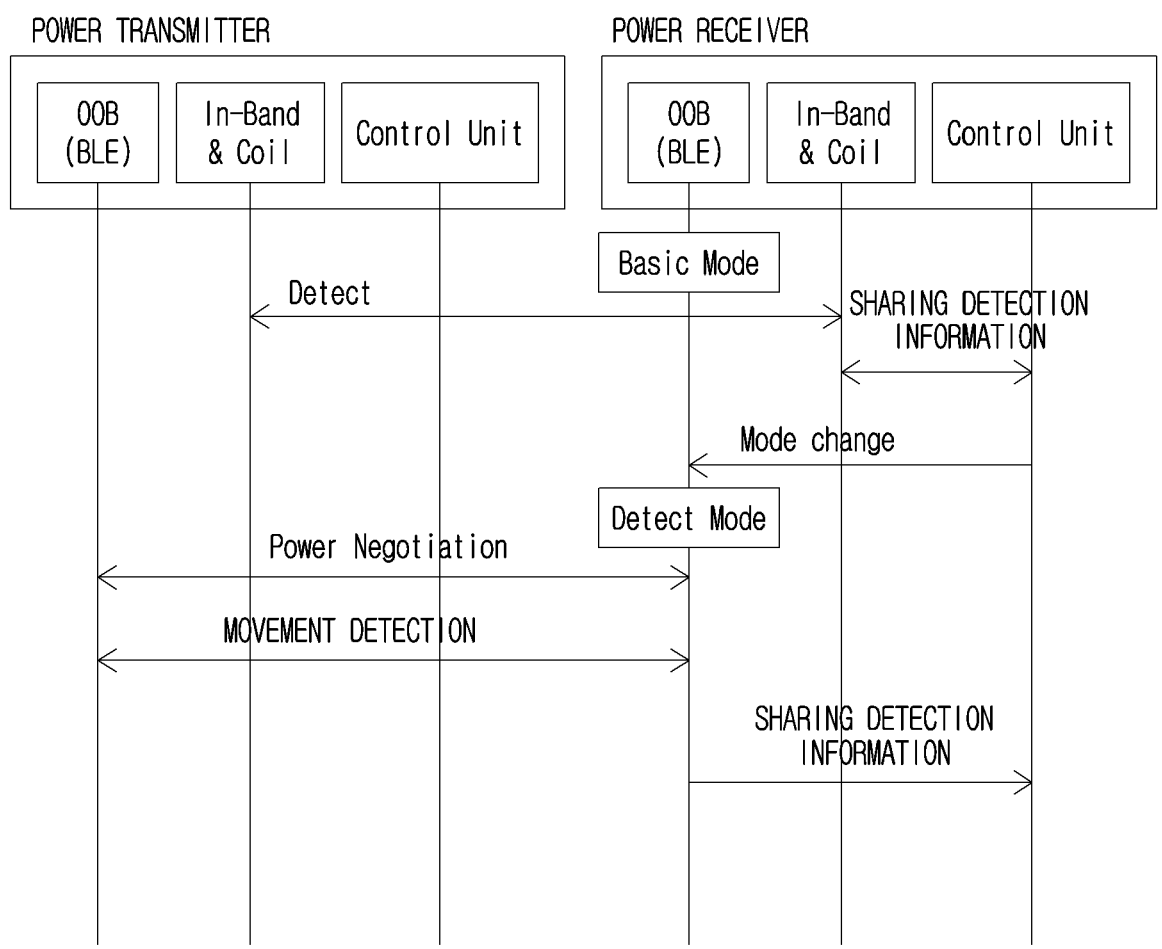
FIG. 33 is a diagram illustrating an additional example of a location information-based wireless power transmission method to which the present disclosure is applicable.

FIG. 33 is a diagram illustrating an additional example of a location information-based wireless power transmission method to which the present disclosure is applicable.

In FIG. 33, the power transmitter (i.e., PTx) may include an OOB module (e.g., BLE module), an in-band module and a primary coil, and a control unit. The power receiver (i.e., PRx) may include an OOB module (e.g., a BLE module), an in-band module and a secondary coil, and a control unit.

Until the PRx detects the presence of the PTx, the OOB module of the PRx may operate in the basic mode.

If the in-band module and/or coil of the PRx detects the proximity of the PTx, the detection information may be shared with the control unit. Accordingly, the control unit may transmit a message requesting or instructing the OOB module to change the mode.

Based on the message from the control unit, the OOB module may change the mode from the basic mode to the detect mode.

In the detect mode, by selecting and driving two antennas among a plurality of antennas (e.g., three or more antennas) included in the PRx, movement (or relative location change) of the PRx with respect to the PTx may be detected. When movement (or relative location change) is detected, the OOB module of the PRx may share detection information on whether movement (or relative location change) has occurred and/or the degree of movement with the control unit.

Before or during the movement (or relative location change) detection operation, the OOB module of the PRx may exchange messages for the power negotiation procedure with the OOB module of the PTx.

Figure 34:
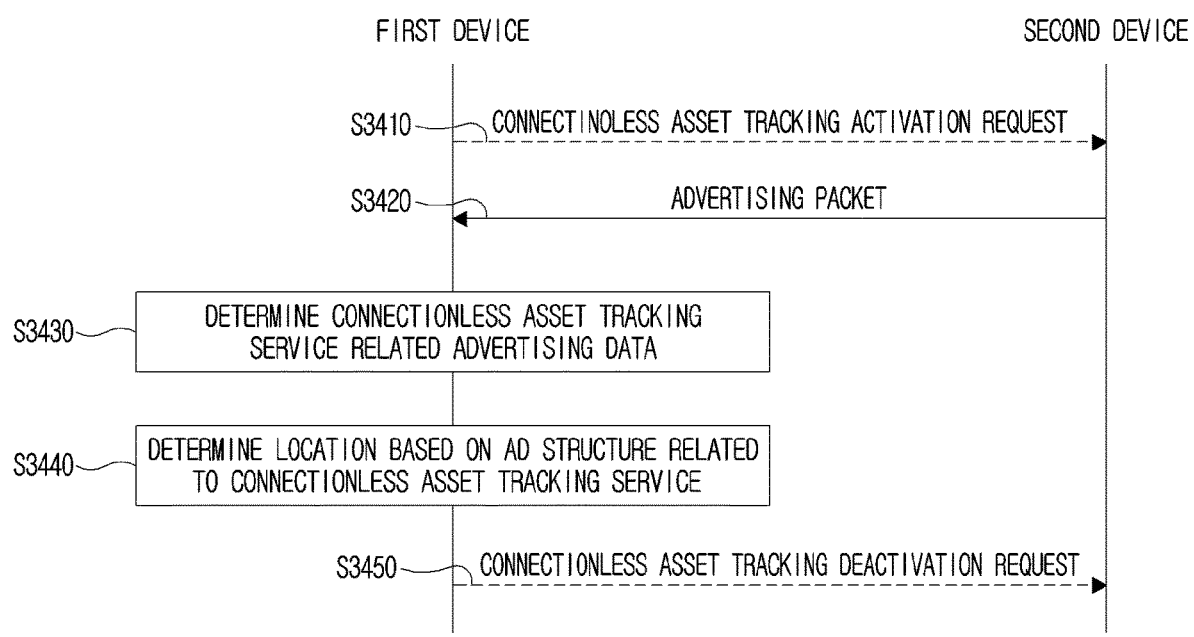
FIG. 34 is a flowchart illustrating a connectionless asset tracking service method to which the present disclosure may be applied.

FIG. 34 is a flowchart for describing a connectionless asset tracking service method to which the present disclosure may be applied.

In step S3410, the first device may transmit a message requesting activation of connectionless asset tracking to the second device. For example, when the first device is a client, a characteristic for connectionless asset tracking activation may be written to a second device that is a server. Alternatively, the first device may read a characteristic of the second device for connectionless asset tracking activation.

In step S3420, the first device may detect or receive an advertising packet from the second device. One or more AD structures may be included in the advertising packet.

In step S3430, the first device may determine whether at least one of the received one or more AD structures is an AD structure related to a connectionless asset tracking service. For example, when an AD type field included in a certain AD structure includes a value indicating a connectionless asset tracking service, it may be determined that the corresponding AD structure is an AD structure related to a connectionless asset tracking service. For example, the host of the first device may determine whether a specific AD structure is an AD structure related to a connectionless asset tracking service.

In step S3440, the first device may determine the location based on the AD structure related to the connectionless asset tracking service. For example, the first device may determine the location based on PN data related to connectionless asset tracking included in the AD data field in the corresponding AD structure. The localization may include various methods such as AoA, AoD, and the like, and one or more of a location with respect to the first device, a location with respect to the second device, or a relative location of the first device and the second device may be determined. For example, the host of the first device may provide a command to the controller to activate I/Q sampling. The command may be provided along with parameters related to I/Q sampling.

In step S3450, the first device may transmit a message requesting deactivation of connectionless asset tracking to the second device. For example, when the first device is a client, a characteristic for deactivating connectionless asset tracking may be written to a second device that is a server. Alternatively, the first device may read a feature for deactivation of connectionless asset tracking of the second device.

For example, the first device may provide or write information about a time related to activation or deactivation of connectionless asset tracking to the second device. Alternatively, the first device may obtain or read information about a time related to activation or deactivation of connectionless asset tracking from the second device.

Figure 35:
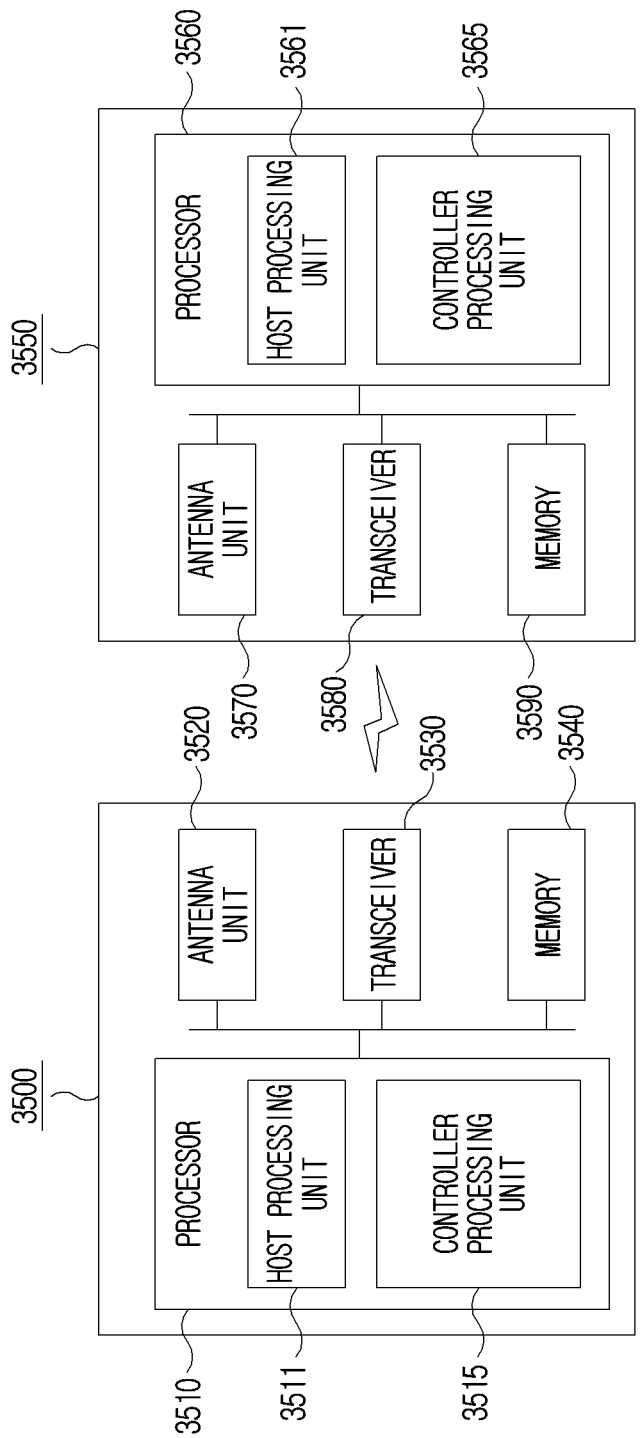
FIG. 35 is a diagram illustrating a configuration of a first device and a second device to which the present disclosure may be applied.

FIG. 35 is a diagram illustrating a configuration of the first device and the second device to which the present disclosure is applicable.

The first device 3500 may include a processor 3510, an antenna unit 3520, a transceiver 3530, and a memory 3540.

The processor 3510 performs baseband-related signal processing and may include a host processor 3511 and a controller processor 3515. The host processing unit 3511 and the controller processing unit 3515 may exchange information through HCI. The host processing unit 3511 may process operations such as L2CAP, ATT, GATT, GAP, and LE profile layers. The controller processing unit 3515 may process operations such as LL and PHY layers. The processor 3510 may control the overall operation of the first device 3500 in addition to performing baseband-related signal processing.

The antenna unit 3520 may include one or more physical antennas. The transceiver 3530 may include a radio frequency (RF) transmitter and an RF receiver. The memory 3540 may store information processed by the processor 3510 and software, an operating system, and an application related to the operation of the first device 3500, and may include components such as a buffer.

The processor 3510 of the first device 3500 may be configured to implement the operation of the first device (or the client device) in the embodiments described in the present disclosure.

For example, the host processing unit 3511 of the processor 3510 of the first device 3500

The controller processing unit 3515 may process the advertising packet received from the second device 3550 through the transceiver 3530 and store it in the memory 3540.

The host processing unit 3511 may determine whether one or more AD structures included in the received advertising packet are AD structures related to a connectionless asset tracking service. If so, the host processing unit 3511 may provide an I/Q sampling activation command to the controller processing unit 3515. The command may be provided along with parameters related to I/Q sampling.

For example, when the AD type field included in the AD structure includes a value indicating the connectionless asset tracking service, the host processing unit 3511 may determine that the corresponding AD structure is an AD structure related to a connectionless asset tracking service.

For example, the controller processing unit 3515 may process (e.g., perform I/Q sampling) PN data included in an AD data field of an AD structure related to a connectionless asset tracking service. Based on this, the first device 3500 may determine a location.

The second device 3550 may include a processor 3560, an antenna unit 3570, a transceiver 3580, and a memory 3590.

The processor 3560 performs baseband-related signal processing and may include a host processor 3561 and a controller processor 3565. The host processing unit 3561 and the controller processing unit 3565 may exchange information through HCI. The host processing unit 3561 may process operations such as L2CAP, ATT, GATT, GAP, and LE profile layers. The controller processing unit 3565 may process operations of the LL layer, the PHY layer, and the like. The processor 3560 may control overall operations of the second device 3560 in addition to performing baseband-related signal processing.

The antenna unit 3570 may include one or more physical antennas. The transceiver 3580 may include an RF transmitter and an RF receiver. The memory 3590 may store information processed by the processor 3560 and software, an operating system, and an application related to the operation of the second device 3550, and may include components such as a buffer.

The processor 3560 of the second terminal device 3550 may be configured to implement the operation of the second device (or server device) in the embodiments described in the present invention.

For example, the host processing unit 3561 of the processor 3560 of the second device 3550 may provide, based on the connectionless asset tracking activation request provided from the first device 3500, information/command necessary for the controller processing unit 3565 to generate an advertising packet including one or more AD structures related to connectionless asset tracking to the controller processing unit 3565.

For example, the host processing unit 3561 may not provide, based on the request for deactivating connectionless asset tracking provided from the first device 3500, information to the controller processing unit 3565 or may instruct the controller processing unit 3565, so that the controller processing unit 3565 does not generate an advertising packet including an AD structure related to connectionless asset tracking.

For example, the host processing unit 3561 may maintain and update characteristics related to connectionless asset tracking (e.g., connectionless asset tracking activation/deactivation, connectionless asset tracking related time information).

In the operations of the first device 3500 and the second device 3550, the descriptions of the first device (or device #1 or client) and the second device (or device #2 or server) in the examples of the present disclosure may be equally applied, and overlapping descriptions will be omitted.

Various embodiments of the present disclosure may be implemented by hardware, firmware, software, or a combination thereof. For implementation by hardware, various embodiments of the present disclosure may be implemented one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), general purpose It may be implemented by a processor (general processor), a controller, a microcontroller, a microprocessor, and the like.

The scope of the present disclosure includes software or machine-executable instructions (e.g., operating system, application, firmware, program, etc.) that cause operation according to the method of various embodiments to be executed on a device or computer, and a non-transitory computer-readable medium in which such software or instructions are stored and executed on a device or computer. Instructions that may be used to program a processing system to perform the features described in this present disclosure may be stored on/in a storage medium or computer-readable storage medium, and features described in the present disclosure may be implemented using a computer program product including such the storage medium. The storage medium may include, but is not limited to, a quick random access memory such as DRAM, SRAM, DDR RAM or other random access solid state memory device, one or more magnetic disk storage devices, optical disk storage devices, flash memory devices, or may include non-volatile memory such as other non-volatile solid state storage devices. The memory optionally includes one or more storage devices located remotely from the processor(s). The memory or alternatively the non-volatile memory device(s) within the memory includes a non-transitory computer-readable storage medium. Features described in this present disclosure may be stored on any one of the machine readable media to control hardware of the processing system, and it may be incorporated into software and/or firmware that allows the processing system to interact with other mechanisms that utilize results in accordance with embodiments of the present disclosure. Such software or firmware may include, but is not limited to, application codes, device drivers, operating systems, and execution environments/containers.

INDUSTRIAL APPLICABILITY

Embodiments of the present disclosure may be applied to various wireless communication systems to increase the performance of the wireless communication system.

The invention claimed is:

1. A method for a connectionless asset tracking service in a wireless communication system, the method comprising:
receiving, by a first device, an advertising packet from a second device;
detecting, by a host of the first device, that at least one advertising data structure (AD structure) included in the advertising packet is an AD structure related to the connectionless asset tracking service based on determining that an AD type field of the AD structure includes a value indicating the connectionless asset tracking service; and
determining, by the first device, a location based on the AD structure related to the connectionless asset tracking service,
wherein the AD structure includes an AD length field, the AD type field, and an AD data field, wherein the AD data field of the AD structure related to the connectionless asset tracking service includes pseudo-noise data used for measuring an angle of arrival (AoA) related to the connectionless asset tracking, and wherein, before the host determines that the AD type field of the AD structure includes the value indicating the connectionless asset tracking service, a controller of the first device samples and stores the advertising packet including the AD structure in a buffer.

2. The method of claim 1, wherein:

the host provides a command for activating In-phase/Quadrature (I/Q) sampling to the controller of the first device, and a result of the I/Q sampling is used for measuring the AoA related to the connectionless asset tracking.

3. The method of claim 2, wherein:

the command is provided together with a parameter related to the I/Q sampling.

4. The method of claim 1, wherein:

a message for requesting activation or deactivation of the connectionless asset tracking service is transmitted from the first device to the second device.

5. The method of claim 1, wherein:

information on a time related to activation of the connectionless asset tracking service is provided from the first device to the second device.

6. The method of claim 1, wherein:

the advertising packet is a packet of a specific format for a device belonging to a mesh network.

7. The method of claim 1, wherein:

the first device is a connectionless asset tracking service client, and the second device is a connectionless asset tracking service server.

8. A first device for performing a connectionless asset tracking service in a wireless communication system, the device comprising:

a transceiver;

a memory; and a processor coupled to the transceiver and the memory, wherein the processor is configured to:

receive, by the first device, an advertising packet from a second device;

detect, by a host of the first device, that at least one advertising data structure (AD structure) included in the advertising packet is an AD structure related to the connectionless asset tracking service based on determining that an AD type field of the AD structure includes a value indicating the connectionless asset tracking service; and determine, by the first device, a location based on the AD structure related to the connectionless asset tracking service, wherein the AD structure includes an AD length field, the AD type field, and an AD data field, wherein the AD data field of the AD structure related to the connectionless asset tracking service includes pseudo-noise data used for measuring an angle of arrival (AoA) related to the connectionless asset tracking, and wherein, before the host determines that the AD type field of the AD structure includes the value indicating the connectionless asset tracking service, a controller of the first device samples and stores the advertising packet including the AD structure in a buffer.

* * * * *